US010064203B2

(12) United States Patent
Shattil et al.

(10) Patent No.: US 10,064,203 B2
(45) Date of Patent: Aug. 28, 2018

(54) LPI/LPD COMMUNICATION SYSTEMS

(71) Applicant: Department 13, LLC, Boulder, CO (US)

(72) Inventors: Steve J. Shattil, Cheyenne, WY (US); Robi Sen, McLean, VA (US)

(73) Assignee: Department 13, Inc., Columbia, MD (US)

( * ) Notice: Subject to any disclaimer, the term of this patent is extended or adjusted under 35 U.S.C. 154(b) by 0 days.

(21) Appl. No.: 15/838,308

(22) Filed: Dec. 11, 2017

(65) Prior Publication Data

US 2018/0103481 A1    Apr. 12, 2018

Related U.S. Application Data

(60) Continuation of application No. 14/980,493, filed on Dec. 28, 2015, now Pat. No. 9,844,061, which is a
(Continued)

(51) Int. Cl.
*H04B 7/0456* (2017.01)
*H04W 72/08* (2009.01)
*H04W 12/08* (2009.01)
*H04W 12/04* (2009.01)
*H04L 5/00* (2006.01)
*H04W 16/14* (2009.01)
(Continued)

(52) U.S. Cl.
CPC ........ *H04W 72/082* (2013.01); *H04B 7/0456* (2013.01); *H04L 5/0007* (2013.01); *H04L 5/0055* (2013.01); *H04L 9/0875* (2013.01); *H04L 63/061* (2013.01); *H04W 12/04* (2013.01); *H04W 12/08* (2013.01); *H04W 16/14* (2013.01); *H04L 63/0435* (2013.01)

(58) Field of Classification Search
CPC ... H04W 72/082; H04W 16/14; H04W 12/04; H04W 12/08; H05K 999/99; H04L 63/061; H04L 9/0875; H04L 5/0007; H04L 5/0055; H04L 63/0435; H04B 7/0456
See application file for complete search history.

(56) References Cited

U.S. PATENT DOCUMENTS 6,031,913 A    2/2000  Hassan et al.
6,686,879 B2   2/2004  Shattil
(Continued)

OTHER PUBLICATIONS

J.L. Brooks, Et al., "Coherence Multiplexing of Fiber-optic Interferometric Sensors," Journal of Lightwave Technology, vol. LT-3, No. 5, Oct. 1985.
(Continued)

*Primary Examiner* — Hashim S Bhatti
(74) *Attorney, Agent, or Firm* — Steven J Shattil

(57) ABSTRACT

A first node in a wireless network retransmits a data signal. The node employs a precoder that generates transmit power values from a message to be transmitted and precodes the data signal with the transmit power values before the data signal is retransmitted. A second node receives the retransmitted signal. The second node uses a reference signal processor configured to determine the data signal and a decoder configured to remove the data signal from the received signal. The power values are estimated and processed to decode the information therefrom.

24 Claims, 22 Drawing Sheets

Related U.S. Application Data division of application No. 14/498,499, filed on Sep. 26, 2014, now Pat. No. 9,473,226, which is a division of application No. 13/757,032, filed on Feb. 1, 2013, now Pat. No. 8,929,550.

(60) Provisional application No. 61/594,086, filed on Feb. 2, 2012.

(51) Int. Cl.
*H04L 9/08* (2006.01)
*H04L 29/06* (2006.01)

(56) References Cited

U.S. PATENT DOCUMENTS

| | | |
|---|---|---|
| 7,430,257 B1 | 9/2008 | Shattil |
| 8,051,181 B2 | 11/2011 | Larson et al. |
| 8,122,505 B2* | 2/2012 | Verma ............... H04L 43/0817 726/22 |
| 8,180,057 B1 | 5/2012 | Delaney et al. |
| 8,594,026 B1 | 11/2013 | Hirschman et al. |
| 8,670,390 B2 | 3/2014 | Shattil |
| 2002/0067757 A1 | 6/2002 | Philips et al. |
| 2003/0163697 A1 | 8/2003 | Pabla |
| 2005/0091399 A1 | 4/2005 | Candan et al. |
| 2005/0228659 A1 | 10/2005 | Mitlin |
| 2006/0034177 A1* | 2/2006 | Schrempp ............... G06F 21/10 370/236 |
| 2006/0146802 A1 | 7/2006 | Baldwin et al. |
| 2008/0232238 A1 | 9/2008 | Agee |
| 2009/0003591 A1* | 1/2009 | Murakami ............ H04L 9/0852 380/28 |
| 2009/0005094 A1 | 1/2009 | Lee et al. |
| 2009/0017829 A1 | 1/2009 | Laroia et al. |
| 2011/0033044 A1* | 2/2011 | Britz ...................... H04K 1/003 380/33 |
| 2011/0170574 A1 | 7/2011 | Ripple et al. |
| 2011/0173696 A1 | 7/2011 | Dynes et al. |
| 2012/0231739 A1 | 1/2012 | Chen et al. |
| 2013/0078954 A1 | 3/2013 | Fan et al. |
| 2013/0095845 A1 | 4/2013 | Lim et al. |
| 2013/0286972 A1* | 10/2013 | Dateki .................. H04W 16/28 370/329 |
| 2014/0038657 A1 | 2/2014 | Jo et al. |
| 2015/0049713 A1* | 2/2015 | Lan ..................... H04L 25/0224 370/329 |

OTHER PUBLICATIONS

A.O. Hero, "Secure space-time communication," IEEE Transactions on Information Theory, vol. 49, No. 12, pp. 3235-3249, Dec. 2003.

R.M. Narayanan, "Sensing and Communications Using Ultrawideband Random Noise Waveforms," 2005 AFOSR Program Review for Sensing, Imaging and Object Recognition, Raleigh, NC, May 26, 2005.

\* cited by examiner

LPI/LPD COMMUNICATION SYSTEMS

CROSS-REFERENCE TO PRIOR APPLICATIONS

This application is a Continuation of U.S. patent application Ser. No. 14/980,493, filed on Dec. 28, 2015, which is a Continuation of U.S. patent application Ser. No. 14/498,499, filed Sep. 26, 2014, now U.S. Pat. No. 9,473,226, which is a Divisional of U.S. patent application Ser. No. 13/757,032, filed on Feb. 1, 2013, now U.S. Pat. No. 8,929,550, which claims priority under 35 U.S.C. 119(e) to U.S. Provisional Application Ser. No. 61/594,086, filed Feb. 2, 2012, all of which are incorporated by reference in their entireties and all of which this application claims priority under at least 35 U.S.C. 120 and/or any other applicable provision in Title 35 of the United States Code.

BACKGROUND

I. Field of the Invention

The present invention relates generating and distributing a secret key for symmetric encryption by employing channel characteristics of the communication channel between a pair of transceivers.

II. Description of the Related Art

While a wireless communication link is vulnerable to interception by unintended receivers, the physical characteristics of the propagation channel (such as reciprocity, highly variable channel distortions, and the uniqueness of those distortions in any given link) can be exploited for generating and exchanging encryption keys, and encrypting transmissions.

Techniques for key generation commonly employ random processes. The physical wireless channel provides the required statistical randomness, and channel reciprocity (i.e., radio waves propagating in both directions of a radio link between a pair of transceivers experience the same multipath channel distortions if their frequencies are the same) potentially enables secure key exchange without transmitting key information that can be intercepted by an unintended receiver. Specifically, each of a pair of transceivers observes a random process (i.e., their propagation channel) that is observed differently by any unintended receiver. For example, each transceiver estimates the common channel from known training signals received from the other transceiver. Temporal and spatial variations of the channel are random. Thus, for transceivers that are sufficiently distant from each other (e.g., typically a few wavelengths), their channel transfer functions are uncorrelated.

Practical examples of where reciprocity can be achieved include wireless systems employing time-division duplex (TDD), such as 802.11, 802.16 (WiMAX), and LTE. However, some aspects of the invention provide for full-duplex operation in non-TDD systems by cancelling transmit signal leakage into the receiver, which enables a pair of transceivers to simultaneously transmit and receive signals in the same frequency band.

SUMMARY

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

In one aspect of the invention, at least one node in a first network requests a communication channel from a second network. Upon receiving a channel assignment from the second network, nodes in the first network employ the assigned channel for communicating in the first network in a manner that is transparent to the second network. The first network may be a peer-to-peer network and the second network may be a cellular network.

In accordance with one aspect, nodes communicating in the first network comply with the second network's data transmission format. For example, the nodes may communicated the first network's network control functions in predetermined portions of the data payload portion of the second network's frame format.

In an aspect of the invention, a first node and a second node request uplink and downlink channels from the second network. The first node sends a request to the second node to establish a peer-to-peer link either before or after receiving assigned channels from the second network. Upon receiving an acknowledgement from the second node, at least one of the uplink and downlink channels is employed for communicating in the first network. For example, the first node may communicated directly with the second node, wherein the "directly" means that there are no intervening servers or routers that are part of the second network's infrastructure.

In another aspect, a transmitter selects a decoy data signal as a carrier signal, synthesizes channel distortions bearing data; and distorts the carrier signal with the channel distortions prior to transmission. This method may comprise providing an undistorted version of the decoy data to an intended receiver. For example, a clean (i.e., undistorted) version of the decoy data may be transmitted to the intended receiver via an alternative channel in the first network or via the second network. The decoy data signal may be a retransmitted broadcast signal or a predetermined data sequence that is stored in memory or that can otherwise be locally reproduced by the intended receiver.

Another aspect of the invention comprises receiving a decoy data signal having synthesized data-bearing channel distortions and natural channel distortions; receiving a clean decoy data signal; and distinguishing between the synthesized data-bearing channel distortions and the natural channel distortions.

In another aspect of the invention, a transmitting node selects a decoy data signal vector for transmission, generates a MIMO precoding matrix from a message to be sent between the transmitting node and a receiving node; and multiplies the decoy data signal vector with the MIMO precoding matrix for constructing a precoded signal vector, which is transmitted.

In one aspect, the MIMO precoding matrix comprises transmit power values for each spatial subchannel based on the message and calculated eigenvalues of matrix $HH^\dagger$, where H is the estimated MIMO channel matrix.

Although particular aspects and embodiments are described herein, many variations and permutations of these embodiments fall within the scope of the invention. Although some benefits and advantages of aspects of the invention are mentioned, the scope of the invention is not intended to be limited to particular benefits, uses, or objectives. Rather, aspects of the invention are intended to be broadly applicable to different applications, system configurations, networks, and devices, some of which are illustrated by way of example in the figures and in the following description. The detailed description and drawings are merely illustrative of some aspects of the invention rather than limiting, the scope of the invention being defined by the appended claims and equivalents thereof.

BRIEF DESCRIPTION OF THE DRAWINGS

The invention is illustrated in the figures of the accompanying drawings which are meant to be exemplary and not limiting, in which like references are intended to refer to like or corresponding parts, and wherein.

DETAILED DESCRIPTION

In the following description, reference is made to the accompanying drawings that form a part hereof, and in which is shown by way of illustration specific aspects in which the invention may be practiced. It is to be understood that other aspects and embodiments may be utilized, and structural changes may be made without departing from the scope of the present invention.

Figure 1:
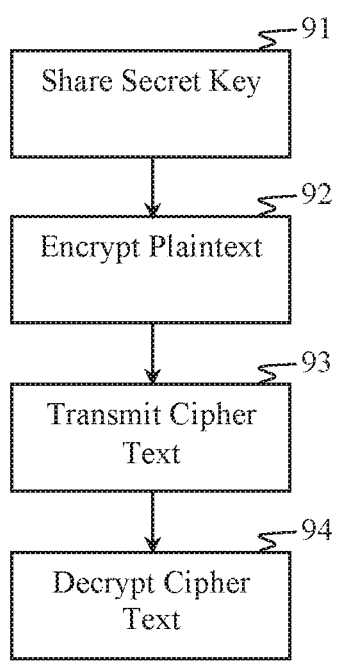
FIG. 1 is a flow diagram of a secure communication method that can be configured in accordance with aspects of the invention.

FIG. 1 is a flow diagram of a secure communication method that can be configured in accordance with aspects of the invention. A secret key is shared 91 between a first node and a second node. As used herein, a secret key is shared between a pair of legitimate nodes, and is typically kept secret. Key distribution is an important aspect for maintaining security in a cryptographic system, and it is performed in a way that minimizes the chance of it being intercepted by an unintended party.

The first node employs the secret key in an encryption algorithm for encrypting plaintext data 92. As used herein, plaintext is a message to be sent between at least two legitimate nodes. Plaintext is an input of the encryption process 92. As used herein, the encryption algorithm employs the secret key for encoding the plaintext to produce a cipher-text output. The resulting cipher text is transmitted to the second node 93. The second node employs the secret key in a decryption algorithm for decoding the cipher text 94, thereby producing an estimate of the plaintext data. As used herein, a decryption algorithm employs the secret key for decoding the cipher text, which is an encrypted version of the plaintext.

Figure 2:
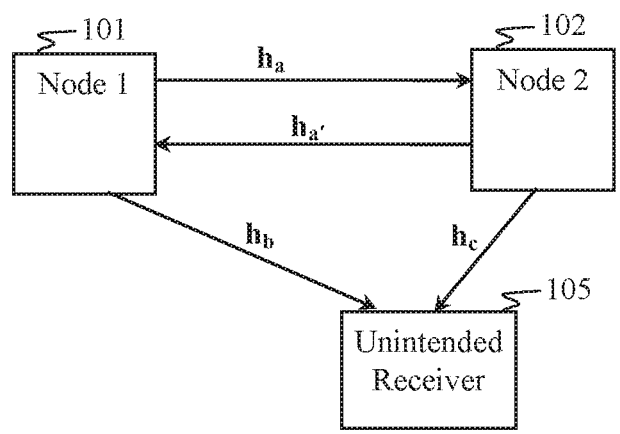
FIG. 2 is a block diagram of a wireless communication system that may comprise components configured in accordance with aspects of the invention.

FIG. 2 is a block diagram of a wireless communication system that may be configured to operate in accordance with aspects of the invention. A first node (Node 1) 101 and a second node (Node 2) 102 communicate with each other over a wireless link. Reciprocal channel vectors between Node 1 and Node 2 are represented by $h_a$ and $h_{a'}$, respectively. Channels $h_b$ and $h_c$ convey information to a third, unintended receiver 105 (e.g., an eavesdropper).

Due to noise and estimation errors, the channel estimates at Nodes 1 and 2 are $\hat{h}_a = h_a + \epsilon_1$ and $\hat{h}_{a'} = h_{a'} + \epsilon_2$, respectively, where $\epsilon_i$ is a zero-mean complex Gaussian estimation error at node i having variance $\sigma_i^2$. The channel vectors may represent frequency bins in an OFDM system or stacked subspace elements in a MIMO channel. In some aspects of the invention, a MIMO-OFDM system may be employed.

The size of the secret key depends on the number of unique information bits that can be extracted from the channel measurements, which depends on the richness of the multipath channel. The theoretical number of unique bits is expressed by $$I_K = \log_2 |R_{aa} R_\sigma^{-1} + I|,$$

where $R_\sigma = (\sigma_1^2 + \sigma_2^2)I + \sigma_1^2 \sigma_2^2 R_{aa}^{-1}$, and $R_{aa} = E\{h_{aa} h_{aa}^H\}$ is the covariance matrix of $h_a$.

Since differences in channel estimates at Nodes 1 and 2 can occur due to noise, the number of unique information bits that can be generated is typically well below the theoretical limit. Therefore, some aspects of the invention provide for combining correlated channel samples to provide each channel measurement with an improved SNR. For example, samples of closely spaced frequency bins, multiple samples within the channel's coherence time, and/or samples of highly correlated spatial channels may be combined to produce each channel measurement, thus increasing the number of unique information bits that can be generated in practical systems.

If the size of the plaintext exceeds the key size, one aspect of the invention reduces the amount of data that needs to be encrypted by employing a data-sanitization technique. Specifically, the amount of plaintext that requires encryption may be reduced by separating sensitive data from non-sensitive data in the plaintext information to be transmitted, followed by encrypting the sensitive data portion. A tiered encryption process may be employed whereby a higher level of security is provided for encrypting the sensitive data and a less secure encryption may be applied to the non-sensitive data.

Figure 3:
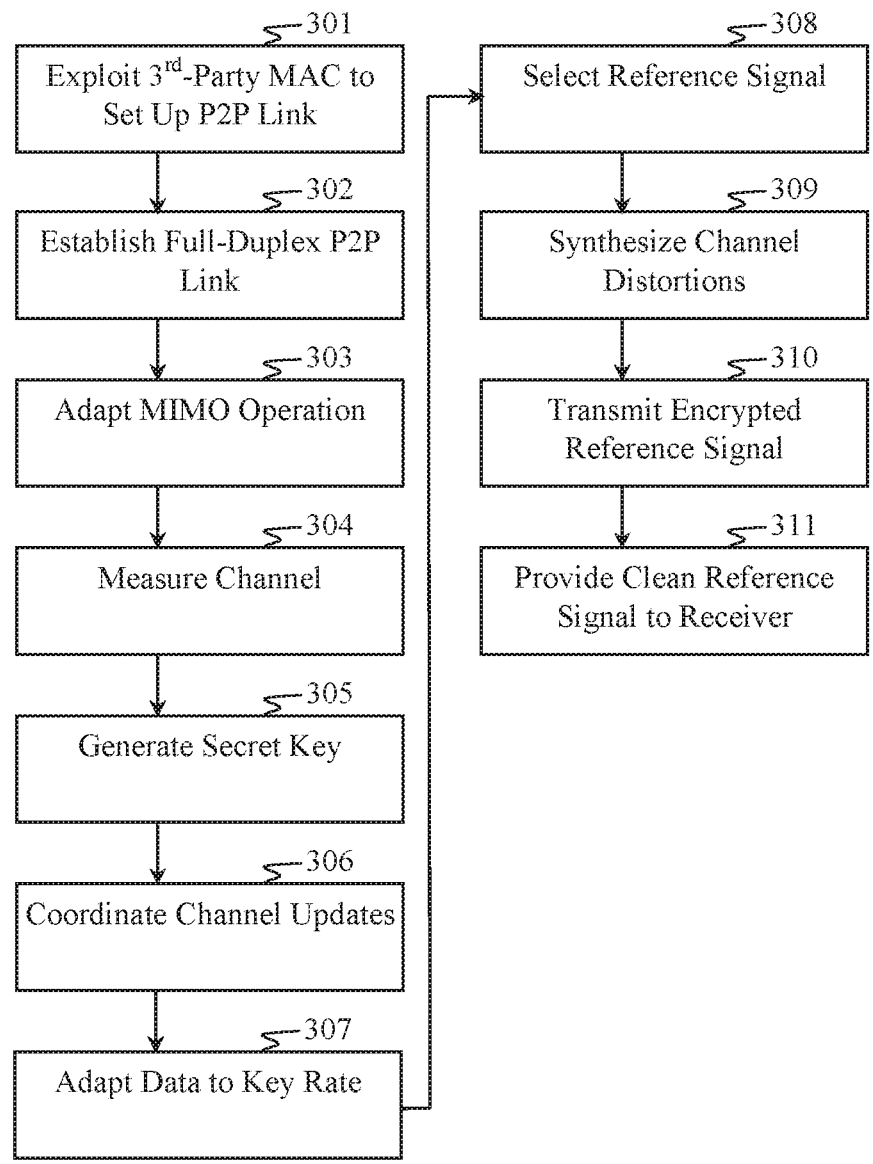
FIG. 3 is a flow diagram of a communication method according to an aspect of the invention.

FIG. 3 is a flow diagram of a communication method according to an aspect of the invention. At least one of a pair of nodes exploits a third-party communications network, such as a cellular network, for setting up a peer-to-peer link 301 between the nodes. Once the nodes agree upon radio channels assigned by the third-party network, the nodes may employ the agreed-upon channels for establishing a full-duplex peer-to-peer link 302 that is transparent to the third-party network. For example, each of the nodes may simultaneously transmit and receive radio signals in the same frequency band while employing interference cancellation for canceling transmit leakage signals in the receiver. In some aspects of the invention, the nodes may transmit and receive signals using downlink and/or broadcast channels employed by the third-party network. In such aspects, full-duplex operation 302 comprises employing interference cancellation for cancelling any third-party network transmissions in the signals received from the peer-to-peer link.

Each of the nodes may comprise multiple antennas, such as by employing MIMO and/or cooperative-MIMO. In aspects of the invention wherein the nodes employ antenna-array processing (e.g., virtual array processing), any combination of array-processing operations may be adapted 303, such as the number of antennas, precoding operations, and/or the type of combining algorithms employed. In one aspect of the invention, a beaconing protocol may be employed by one or both nodes for determining a preferred set of beam patterns for use in the peer-to-peer link. Adapting the MIMO operation 303 may comprise nulling interference, such as downlink signals transmitted by the third-party network or jamming signals transmitted by hostile parties. In some aspects, adapting the MIMO operation 303 comprises beamforming operations that degrade the SNR of unintended receivers (e.g., eavesdroppers).

Channel measurement 304 (e.g., channel estimation) of the peer-to-peer radio channel is performed by both nodes, and a secret key is generated by each node 305. Various techniques may be employed for improving the probability of key agreement during either or both steps 304 and 305.

Since the radio channel typically varies with respect to time, channel measurements may be updated 306 at predetermined intervals or at intervals determined by the channel measurements or measured bit-error rates. In some aspects of the invention, channel updates 306 are coordinated based on the secret key. The timing for the transmission of known training symbols or pilot signals may be based on the secret key. In an OFDM system, predetermined symbols (e.g., pilots) may be transmitted on subcarriers denoted by some function of the secret key that is known by both nodes. In a MIMO system, training symbols may be transmitted in predetermined spatial subchannels relative to some function of the secret key.

In various aspects of the invention, the nodes comply with the data transmission format of the third-party network and employ predetermined portions of the data payload of a frame for peer-to-peer network control functions. In some aspects, a portion of the radio resource allocated for data may be employed by the nodes for channel sounding. The selection of the subchannels and the timing of the training signals in the selected subchannels may be determined by the secret key.

In some aspects of the invention, the plaintext data may be modified, such as separated into different levels of sensitivity, which are encrypted using different levels of security. This can effectively reduce the data rate to match a lower key rate 307. For example, adapting the data 307 may comprise performing a form of data sanitization of the plaintext to separate sensitive data from non-sensitive information. The sensitive data may be encrypted using the secret key, and the non-sensitive information may be encrypted using an alternative mechanism.

A reference signal is selected 308 as a carrier signal for the encrypted data. The reference signal may comprise a retransmitted third-party broadcast, a predetermined data sequence that can be locally reproduced by the receiving node, or a decoy signal comprising a "clean" version supplied to the receiving node via an alternative channel.

Channel distortions are synthesized 309 based on a function of the secret key. The channel distortions are imparted to the reference signal, which is transmitted 310 to the receiving node.

Step 301: Leveraging a Third-Party MAC

Figure 4:
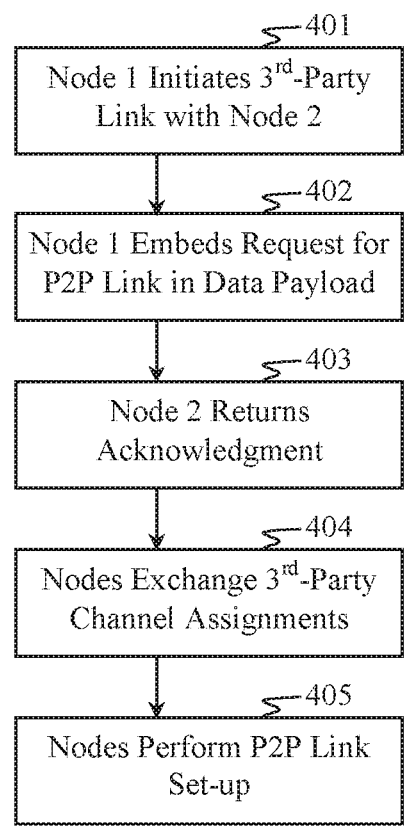
FIG. 4 is a flow diagram for initiating a peer-to-peer communication link in accordance with an aspect of the invention.

FIG. 4 is a flow diagram for initiating a peer-to-peer communication link in accordance with an aspect of the invention, such as may be performed with respect to Step 301 shown in FIG. 3. In this aspect of the invention, a pair of nodes employs a third-party network to assign a communication channel, which the nodes use for peer-to-peer communications by a means that is transparent to the third-party network. For example, in a cellular network, uplink and/or downlink multiple access channels assigned to either or both nodes for cellular communications may be employed by the nodes for peer-to-peer communications. This provides a contention-free radio channel for the duration of the peer-to-peer link and essentially outsources many of the MAC functions required for establishing and maintaining a session.

Figure 5A:
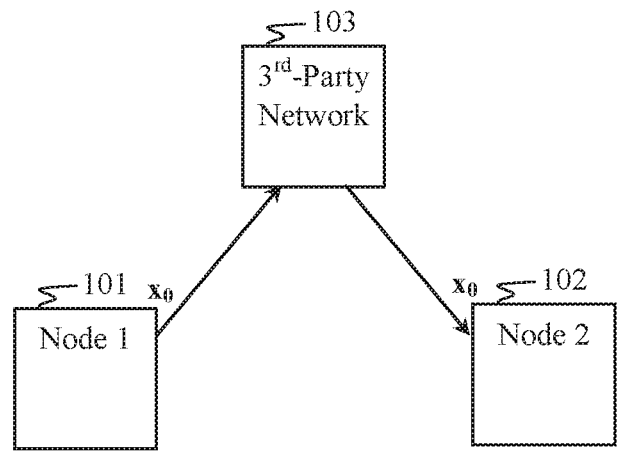
FIG. 5A illustrates part of a method configured in accordance with an aspect of the invention.

A first node initiates a communication link with a second node via a third-party network 401. FIG. 5A illustrates a request message $x_0$ transmitted via a third-party network 103 from the first node 101 to the second node 102. In another aspect of the invention, the first node 101 may transmit the request directly to the second node 102, such as in a peer-to-peer network, and then the pair of nodes 101 and 102 may establish a link via the third-party network 103.

Figure 5B:
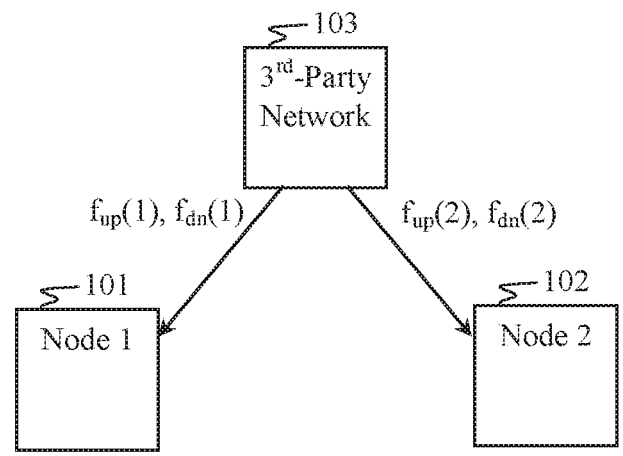
FIG. 5B illustrates part of a method configured in accordance with an aspect of the invention.

In response to the first node's 101 request for a communication link, the third-party network 103 reserves communication resources (e.g., radio channels) for the link and assigns those resources to the first node 101. For example, as illustrated in FIG. 5B, the third-party network 103 assigns a first uplink channel $f_{up}(1)$ and a first downlink channel $f_{dn}(1)$ to the first node 101. Similarly, the third-party network 103 assigns a second uplink channel $f_{up}(2)$ and a second downlink channel $f_{dn}(2)$ to the second node 102.

Once the nodes are connected via the third-party link, the first node sends a request to the second node to establish a peer-to-peer link 402. Such requests and other peer-to-peer network control operations may be communicated inside predetermined portions of the data payload in the third-party transmission frame format.

Figure 6A:
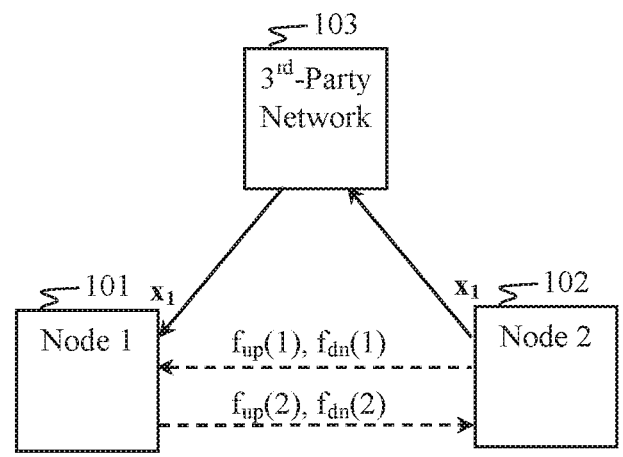
FIG. 6A illustrates part of a method configured in accordance with an aspect of the invention.

The second node 102 responds to the request with an acknowledgement 403 (such as depicted in FIG. 6A), which may be returned via the third-party network 103. The acknowledgement may comprise a message $x_1$ transmitted via the third-party network. Alternatively, the acknowledgement may be transmitted directly to the first node 101, such as in a peer-to-peer network.

Figure 6B:
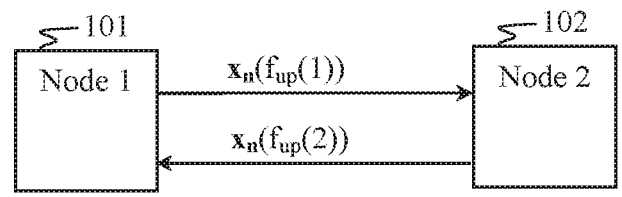
FIG. 6B illustrates part of a method configured in accordance with an aspect of the invention.

The nodes employ the third-party network for exchanging their respective channel assignments 404, such as depicted in FIG. 6B. The nodes 101 and 102 agree upon at least one of the radio channels assigned by the third-party network 103. The selected radio channels may comprise any combination of at least one of the assigned uplink channels, at least one of the assigned downlink channels, and/or at least one broadcast channel, such as a broadcast channel employed by the third-party network. Alternatively, the nodes 101 and 102 may exchange their client information (e.g., their client identifications used by the third-party network 103) and then listen for each other's channel assignments broadcast by the third-party network 103.

The nodes 101 and 102 perform a peer-to-peer link set-up 405 using the agreed-upon radio channel(s). For example, FIG. 6B depicts an aspect of the invention wherein the first node 101 employs its third-party uplink channel for peer-to-peer communications with the second node 102, and the second node 102 employs its third-party uplink channel to communicate with the first node 101 via the peer-to-peer link. In this aspect, multiple access in the peer-to-peer link is established by the channel assignments made by the third-party network 103.

Link set-up 405 typically comprises performing signal acquisition. For example, the first node 101 transmits in its assigned uplink channel, and the second node 102 determines whether it detects the first node's 101 transmission. The nodes 101 and 102 may communicate with each other via the peer-to-peer link and/or via the third-party network 103 for network control functions, such as beam-forming and/or power control.

Figure 6C:
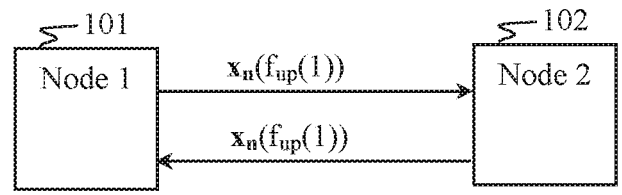
FIG. 6C illustrates part of a method configured in accordance with an aspect of the invention.

FIG. 6C depicts an aspect of the invention wherein both nodes 101 and 102 employ the same third-party channel assignment for peer-to-peer communications. In such aspects, multiple access of the peer-to-peer network is controlled by the nodes 101 and 102. For example, the nodes 101 and 102 may partition the assigned channel into sub-bands, time slots, or CDMA channels for multiple access. Alternatively, the nodes 101 and 102 may simultaneously transmit in the same band while employing self-interference cancellation to achieve full-duplex operation. Such simultaneous transmissions degrade the SNR of signals received by an unintended receiver and make it difficult for the unintended receiver to accurately estimate its channel.

Figure 7A:
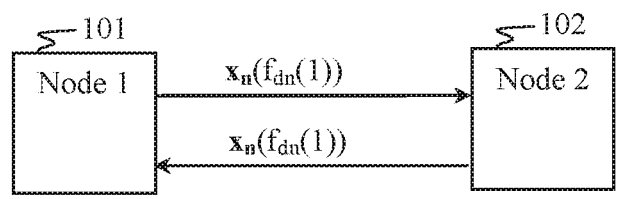
FIG. 7A depicts an aspect of the invention wherein two nodes employ the same third-party downlink assignment for peer-to-peer communications.

FIG. 7A depicts an aspect of the invention wherein both nodes 101 and 102 employ the same third-party downlink assignment for peer-to-peer communications. In such aspects, the nodes 101 and 102 must suppress interference caused by the downlink transmission of the third-party network 103. For example, the nodes 101 and 102 may employ beam-forming to null the third-party downlink transmissions during peer-to-peer communications.

Figure 7B:
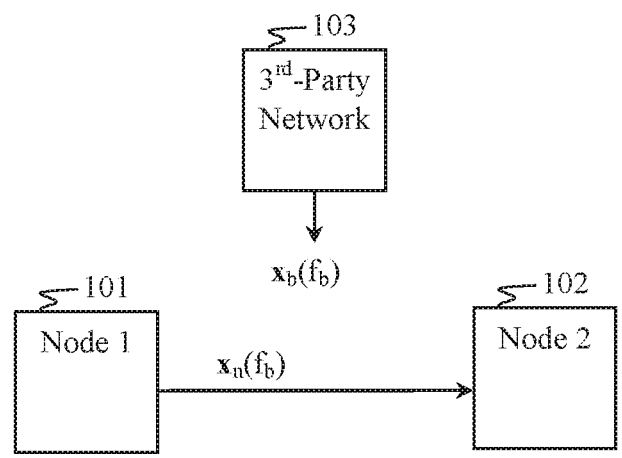
FIG. 7B depicts an aspect of the invention wherein a transmitting node employs a third-party broadcast channel for transmitting signals in a peer-to-peer communication link.

FIG. 7B depicts an aspect of the invention wherein the first node 101 employs a third-party broadcast channel for its peer-to-peer communication link. In such aspects, the second node 102 may employ beamforming to null the received broadcast from the third-party network while the first node 101 is transmitting.

Step 302: Full Duplex Operation

With respect to Step 302 in FIG. 3, some aspects of the invention provide for configuring the nodes 101 and 102 for simultaneously transmitting and receiving signals in a full-duplex mode.

LTE is designed primarily for full-duplex operation in paired spectrum. Specifically, LTE employs a first frequency band for downlink and a second frequency band for uplink. This is referred to as frequency division duplexing (FDD). In contrast, WiMAX operates in a half duplex mode in unpaired spectrum, where information is transmitted in one direction at a time. This is typically referred to as time-division duplexing (TDD). As used herein, with respect to Step 302, full-duplex refers to simultaneously transmitting and receiving in the same frequency band.

The full-duplex mode may be used to provide for channel estimation and covert data communications. During channel estimation, the transmitted signals comprise known symbols and/or pilots. During data transmission, the signals comprise a known reference signal imparted with synthesized channel distortions that convey information. When both nodes 101 and 102 simultaneously transmit in the same band, the SNR at an unintended receiver is reduced, making it difficult for the unintended receiver to accurately estimate its channel or differentiate between natural and synthesized channel distortions in the transmitted signals.

When two radio signals are received by an antenna, the voltage generated at the antenna is the sum of the two signals. That voltage is down-converted to a baseband signal and scaled such that the combined signal occupies a predetermined voltage range to ensure that the full dynamic range of the receiver's ADC is used. This provides the best possible representation of the analog signal in the digital domain. If one signal is much smaller than the other signal, then it is represented by fewer bits than if the smaller signal arrived at the ADC by itself.

The transmitted signal can cause self-interference at the receiving antenna that exceeds the desired received signal of interest by as much as 100 dB. With such a large difference in the signal powers, the finite resolution of the ADC is the main bottleneck in enabling full-duplex communications. To achieve full-duplex communications over reasonable distances, it is necessary to suppress the self-interference before it reaches the ADC.

Figure 8:
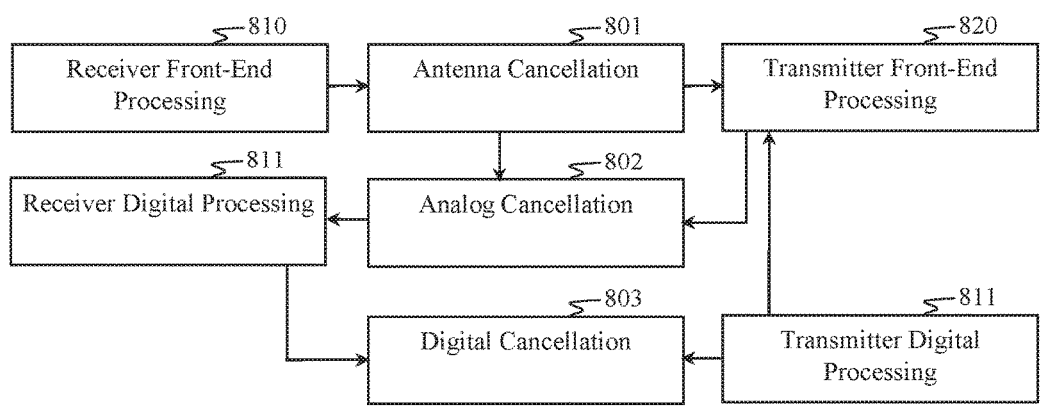
FIG. 8 is a flow diagram of a method according to one aspect of the invention that employs a combination of antenna cancellation, analog cancellation, and digital cancellation for full-duplex operation.

FIG. 8 is a flow diagram of a method according to one aspect of the invention that employs a combination of antenna cancellation 801, analog cancellation 802, and digital cancellation 803 to achieve full-duplex operation. The isolation (in dB) achieved by employing multiple stages of cancelation is additive.

In one aspect of the invention, separate transmit and receive antennas are employed. The antennas may be positioned in close proximity to each other such that their channels are highly correlated. For example, the separation between the antennas may be less than one wavelength. This close proximity ensures that the channel measured by Node 1 is substantially identical to the channel measured by Node 2. However, such close proximity causes substantial coupling (i.e., self-interference) between the transmitter and the receiver when operating simultaneously in the same band.

In one aspect of the invention, antenna cancellation may comprise providing for passive interference suppression wherein the antennas are positioned to reduce self-interference. For example, mobile devices typically employ omni-directional antennas. However, such antennas are not perfectly omni-directional, especially in the near field. Omni-directional antennas typically have small gain along the z-axis. Thus, the transmit and receive antennas may be mounted on top of each other.

Passive interference suppression may comprise selecting a transceiver's antenna orientation and/or position to have less gain in the direction of another of the transceiver's antennas. In some aspects of the invention, passive interference suppression may comprise shielding, such as for attenuating antenna gain in a predetermined direction.

Antenna cancellation 801 typically comprises a passive cancellation mechanism, such as configuring a receive antenna system such that a substantial portion of the transmit signal is cancelled at the receiver. Similarly, antenna cancellation may comprise configuring a transmit antenna system to produce a transmission null at the location of the receive antenna system. In one aspect, antenna cancellation 801 comprises combining received signals following RF receiver front-end processing 810. RF receiver front-end processing 810 may comprise filtering and/or down-converting the received signals.

Antenna cancellation 801 may comprise an active cancellation mechanism, such as providing complex gains (e.g., frequency-dependent complex gains) to the received signals prior to combining for enhancing interference cancellation. Similarly, antenna cancellation 801 may comprise providing complex gains (e.g., frequency-dependent complex gains) to the transmitted signals in the transmitter's front-end processing step 820, such as to enhance cancellation of the node's transmitted signal in its receiver. In one aspect of the invention, antenna cancellation comprises both transmit-side and receive-side antenna cancellation for enhancing isolation.

Analog cancellation 802 is an active cancellation mechanism that delivers a canceling signal via an alternative radio chain to the receiver. For example, a cancellation signal is synthesized from the transmit signal, such as in the transmitter front-end processing step 820, and combined with the received signal output from antenna cancellation 801. Analog cancellation may be performed at the transmit frequency (e.g., RF), an intermediate frequency, or at baseband.

Digital cancellation 803 is an active baseband cancellation mechanism that synthesizes a cancellation signal from knowledge of the interfering transmit signal. For example, digital processing 811 in the receiver may comprise down-converting and digitizing the cancelled signal produced from analog cancellation 802 to produce a received digital signal. The transmitter's digital processing 811 synthesizes a digital cancellation signal, which is combined with the received digital signal in the digital cancellation step 803 to produce an interference-cancelled digital signal.

Figure 9:
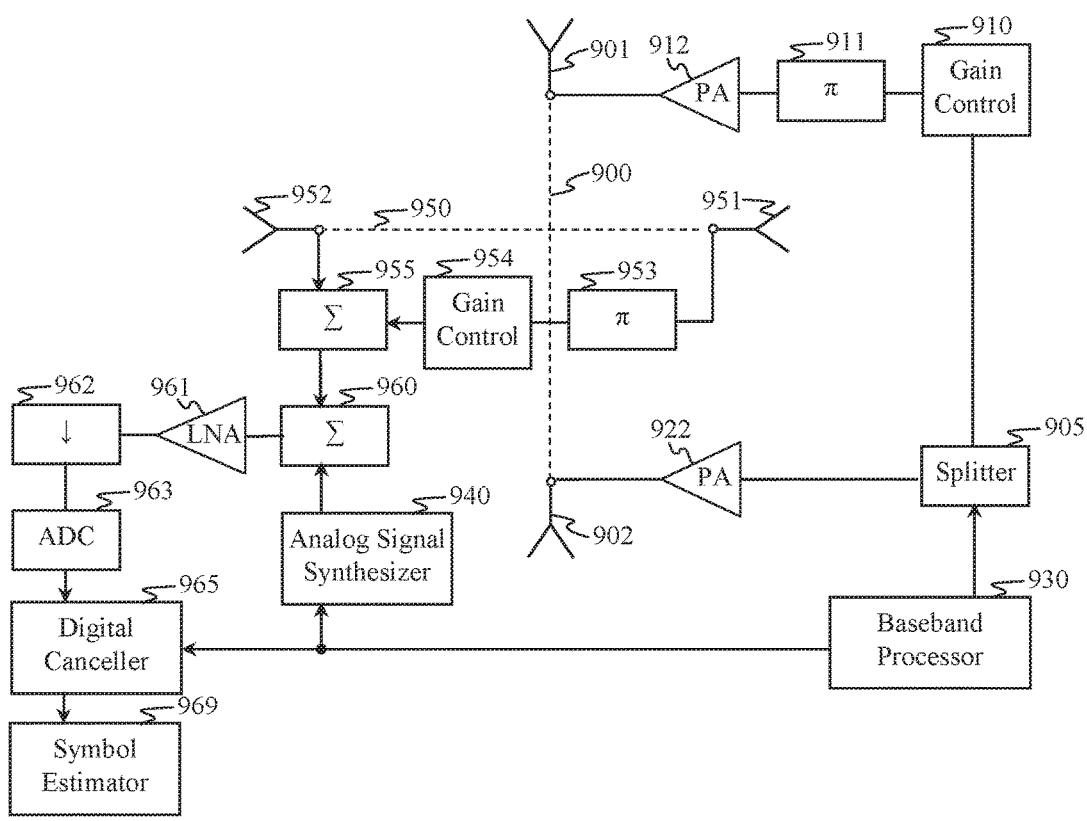
FIG. 9 is a block diagram of a full-duplex transceiver configured in accordance with an aspect of the invention.

FIG. 9 is a block diagram of a full-duplex transceiver configured in accordance with an aspect of the invention to employ a combination of antenna cancellation, analog cancellation, and digital cancellation.

A transmitter antenna system comprises transmit antennas 901 and 902, and a receiver antenna system comprises receiver antennas 951 and 952. The antennas 901, 902, 951, and 952 may be positioned in close proximity to each other such that the transmit and receive channels are highly correlated.

The transceiver depicted in FIG. 9 employs both transmit-side and receive-side antenna cancellation. The antennas 951 and 952 of the receive antenna system are positioned in the transmit antenna system's beam-pattern null 950, and the antennas 901 and 902 of the transmit antennas system are positioned in the receive antenna system's beam-pattern null 900. Specifically, the beam pattern null zone 950 of the transmit antennas 901 and 902 is a location where transmissions from the transmit antennas 901 and 902 are substantially cancelled. Similarly, signals produced by transmission sources located in the beam-patter null 900 of the receive antennas 951 and 952 are substantially cancelled in the receive antenna system. Such antenna placement schemes are well-known in the art, such as described in U.S. Pat. No. 6,211,671, which is hereby incorporated by reference. For example, the '671 patent shows antenna arrangements that provide for substantially identical, but out-of-phase transmit signals, that combine destructively to cancel at the receiver. Similarly, the '671 patent shows receiver configurations for cancelling transmit leakage. Furthermore, the '671 patent shows analog signal cancellation.

Each transmit antenna 901 and 902 comprises a power amplifier, 911 and 912, respectively, for amplifying up-converted transmit signals. One of the transmit branches may comprise a phase shifter 911 for providing a $\pi$ phase shift to one of the transmit signals. A gain control, such as gain control 910, may be provided to at least one of the transmit branches. The gain control 910 may provide for positioning the beam pattern null zone 950 to effect transmit antenna cancellation.

Gain control and phase shifting may be provided to the transmit signal before or after up-conversion (not shown). While not shown, an up-converter may be provided in the splitter 905 or in the signal path preceding the power amplifiers 921 and 922 (but following the gain control 910).

A signal is said to be nulled, or cancelled, when two copies of the signal combine π out of phase to cancel each other, thereby reducing the received signal strength to or below the noise floor. The relative phase between the two signals may be controlled by introducing a phase offset to one of the signals and/or by varying the relative distance between the transmit antennas with respect to the receive antenna. Thus, positioning one antenna system in the beam-pattern null of another antenna system may comprise a combination of physically positioning one or more of the antennas and providing complex gains to one or more antenna signals, such as to select or adjust the beam pattern.

With a symmetric placement of a pair of transmit antennas relative to a receive antenna, a balanced to unbalanced transformer element or any other type of a π-phase shifter inside one of the transmitters may be used to invert one of the transmit signals. Alternatively, such cancellation may be achieved when there is a half-wavelength difference in the separations between the receiver antenna and the two transmit antennas. However, this approach by itself is only effective for narrowband interference cancellation, as the required separations vary with respect to frequency. Thus, as the '671 patent notes, in multiband (e.g., OFDM) or wideband transmissions, frequency-dependent complex weights may be provided to the antenna signals in either or both the transmit and receive antenna systems to enhance cancellation. For example, a different set of complex weights may be employed for weighting each subcarrier in an OFDM signal. Thus, adapting the complex gains provided to the transmit and/or received signals may be part of the antenna-cancellation scheme.

The receive antenna system comprises a gain control 954 and a phase shifter 953 on one of the pair of receive branches. A combiner 955 combines weighted, phase-shifted signals received from antenna 951 with signals received from antenna 952 to provide receiver antenna cancellation. Receive antenna cancellation is performed with the received analog signals at RF, an intermediate frequency, or at baseband. In some aspects of the invention, the combiner 955 may perform any necessary scaling and/or inversion of its input signals to produce an interference-cancelled received signal.

In the transceiver depicted in FIG. 9, receiver antenna cancellation is performed at RF. In accordance with one aspect of the invention, providing for passive interference suppression and/or antenna cancellation eliminates the need for a power amplifier in an analog canceller's RF chain. The analog canceller comprises an analog signal synthesizer 940, which receives a digital transmit signal from a baseband processor 930. The analog signal synthesizer 940 generates an analog cancellation signal, which is a replica of the transmit signal. A combiner 960 combines the analog cancellation signal with the interference-cancelled received signal produced by combiner 955. The combiner 960 may perform any necessary scaling and/or inversion of its input signals to produce an interference-cancelled analog signal.

The interference-cancelled analog signal is amplified by a low-noise amplifier (LNA) 961 and down-converted by a down-converter 962 (e.g., a mixer or a direct-conversion sampler), if necessary. An ADC 963 converts the down-converted analog signal to a digital receive signal. A digital canceller 965 synthesizes a digital cancellation signal from a digital transmit signal received from the baseband processor 930 and cancels the transmit signal leakage in the digital receive signal to produce an interference-cancelled digital signal. The interference-cancelled digital signal may undergo further baseband processing, such as symbol estimation performed by a symbol estimator 969.

Step 303: Adaptive MIMO

Physical-layer security includes waveform security and channel security. Waveform security usually involves hiding transmitted information in the background noise. For example, ultra-wideband transmissions are typically below the noise floor of narrowband receivers. Spread-spectrum modulation, such as direct sequence spread spectrum, spreads a narrowband information signal over a wide bandwidth. The privacy of such direct-sequence modulation depends on the security of the spreading code, which is typically a pseudo-random code.

Channel security typically comprises ensuring that any unintended receiver has a much lower SNR than intended transceivers. For example, beamforming techniques that deliver a highly focused transmission to a desired transceiver reduce the probability that the transmission can be detected and intercepted by an unintended receiver. Beamforming can further reduce the SNR of signals received by unintended receivers via spatially selective jamming. Short-range, low-power transmissions also reduce the probability of interception by unintended receivers.

In one aspect of the invention, a cooperative-MIMO system is employed for spatially focusing transmission power to an intended receiver. A transmitting node selects a predetermined number of local nodes to function as a cooperative antenna array. The selection may comprise determining the trustworthiness of the nodes, which may be performed via any combination of automated processes and user inputs. For example, an authentication procedure may be performed for authenticating each candidate node prior to selection. The trusted nodes may comprise a predetermined set of transceivers, such as transceivers operated by a group of first responders or a team of military personnel. Authentication may comprise requiring a user input from the operator of each candidate transceiver to ensure that none of the selected nodes have been compromised. The number of selected nodes may be determined from any combination of parameters, including the number of unintended receivers within communication range, the number of spatial dimensions employed by each unintended receiver, the estimated SNR of the link between the transmitting node and the intended receiving node, and the number of antennas employed by the intended receiver.

Determining the number of unintended receivers may comprise detecting their transmissions, identifying each node, and tracking each node. One aspect of the invention involves nodes snooping on headers of all ongoing transmissions within radio range in order to identify and track unintended receivers. Due to the close proximity of the cooperating nodes, key distribution between the cooperating nodes can be facilitated, ensuring the security of the keys used to encrypt their local communications. For local-group encryption in a cooperative-MIMO system, a shared secret key generated from channel estimates can be used as a key sequence in a one-time pad, thus achieving virtually perfect secrecy of the locally transmitted data.

Cooperative beamforming is performed by the selected nodes to improve the power ratio γ of transmissions received by the intended receiver versus transmissions received by one or more unintended receivers. For example, in an exemplary multiple-input, single output (MISO) case, the signal received by the desired receiver is $y=h_a^T wx+n_a$, and the signal received by the undesired receiver is $y_u=h_u^T wx+n_u$, where $h_a$ and $h_u$ are the channel vectors, w is a vector of beamforming weights, and $n_a$ and $n_u$ additive white Gaussian noise terms with a variance of $\sigma_i^2$. The power ratio is expressed by $$\gamma = \frac{|h_a^T wx|^2}{|h_u^T wx|^2} = \frac{w^\dagger h_a^* h_a^T w}{w^\dagger h_u^* h_u^T w}$$

The weight vector is selected to focus the transmitted signal at the intended receiver. If the power ratio γ is greater than one, the transmit power can be adjusted to allow the intended receiver to decode the transmission while providing any unintended receiver(s) with a low SNR that prevents reliable detection.

An eigen-beamforming technique may be employed for selecting w. For example, in the MISO system, there is only one non-zero singular value for the channel. The transmit beamforming weight w is chosen to be the singular vector corresponding to the non-zero singular value of the channel $h_a$. Even without precise knowledge of the channels of unintended receivers, eigen-beamforming increases the power ratio γ by maximizing transmission power received at the intended receiver. If the channel $h_u$ is known, the weight vector w may be chosen from a vector in the null space of $h^*_u h_u^T$.

In one aspect of the invention, the transmitter determines the minimum SNR necessary for the intended receiver to decode the transmission and adjusts the transmit power to reduce the likelihood that the unintended receiver(s) could decode the transmission.

Figure 10A:
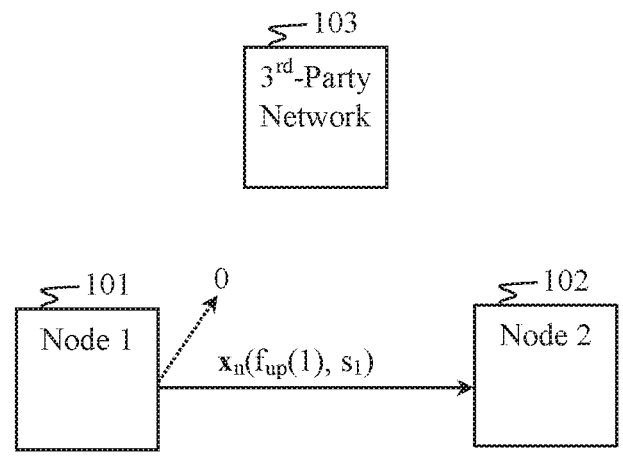
FIG. 10A depicts an aspect of the invention wherein a node employs beamforming to reduce the SNR of its peer-to-peer transmit signal received at a third-party network's receiver.

FIG. 10A depicts an aspect of the invention wherein the first node 101 employs beamforming to reduce the SNR of its peer-to-peer transmit signal received by the third-party network 103. For example, an information-bearing transmit signal $x_n$ comprises a first beam pattern $s_1$ having substantially higher gain in a spatial subchannel used to communicate with the second node 102 compared to a spatial channel employed for communicating with the third-party network 103. Similarly, beamforming may be employed to reduce the SNR of signals received by potential eavesdroppers.

In one aspect of the invention, either or both of the nodes may transmit a decoy signal, such as during peer-to-peer transmission of an information-bearing signal. The decoy signal may be transmitted to the third-party network, such as to hold the assigned channel(s) employed by the peer-to-peer link. In some aspects, the decoy signal may be intended for reducing the SNR of signals received by unintended receivers.

In an aspect of the invention, the first node may transmit a reference signal used by the second node for decoding the information-bearing signal transmitted via the peer-to-peer link. For example, the reference signal may be transmitted via the third-party network, which the second node receives in a different radio channel than the radio channel(s) employed in the peer-to-peer link. Alternatively, the reference signal may be transmitted in the peer-to-peer link, but via an alternative radio channel than the radio channel(s) employed for transmitting the information-bearing signal.

Figure 10B:
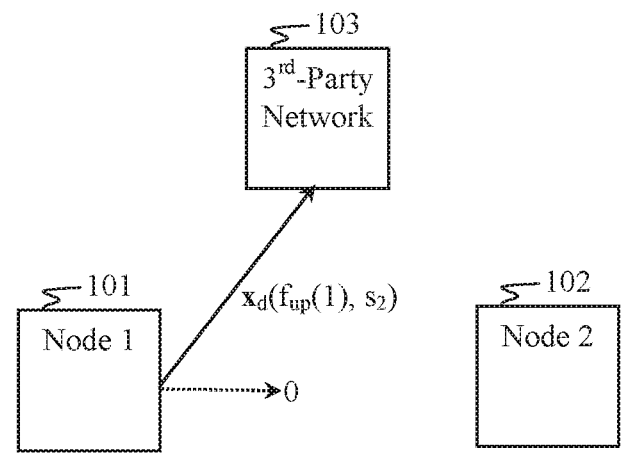
FIG. 10B depicts an aspect of the invention wherein a first node employs beamforming to reduce the power of a decoy signal or reference signal in a spatial subchannel used for communicating with a second node.

FIG. 10B depicts an aspect of the invention wherein the first node employs beamforming to null a decoy signal or reference signal in a spatial subchannel used for communicating with the second node. For example, a decoy interference signal $x_d$ comprises a second beam pattern $s_2$ having a high gain in a spatial subchannel used for communicating with the third-party network and substantially zero gain in a spatial channel employed by the peer-to-peer link. Similarly, the second beam pattern $s_2$ may be configured to provide high-gain transmissions to unintended receivers.

In an aspect of the invention, a first transceiver transmits a signal to a second transceiver that is in the same frequency band as a signal transmitted by a third-party transmitter. The first transceiver's signal comprises known symbols, which are used for channel estimation. This signal also comprises a known reference signal imparted with synthesized channel distortions, which are information-bearing. Interference due to the third-party's transmission makes it difficult for an unintended receiver to differentiate between the natural and synthesized channel distortions in the first transceiver's transmission, especially if the undistorted reference signal employed by the first transceiver is the same signal transmitted by the third-party transmitter. The second transceiver employs the channel information of the channel between the first and second transceivers (which is not known by any unintended receiver) and uses the third-party signal as a reference signal to decode the first transceiver's transmission.

In another aspect of the invention, a first transceiver transmits a first signal to a second transceiver and a second signal to at least one unintended receiver. The first signal comprises known symbols used by the second transceiver for channel estimation. The first signal also comprises a reference signal imparted with synthesized channel distortions that are data-bearing. The first transceiver employs antenna array processing (such as via Cooperative-MIMO) to reduce the power of the second transmission at the second transceiver. For example, the first transceiver may employ beam-pattern null steering or some other pre-coding that cancels the second transmission at the second transceiver. The second transmission may comprise a decoy signal, such as the reference signal imparted with synthesized random channel distortions.

Figure 11:
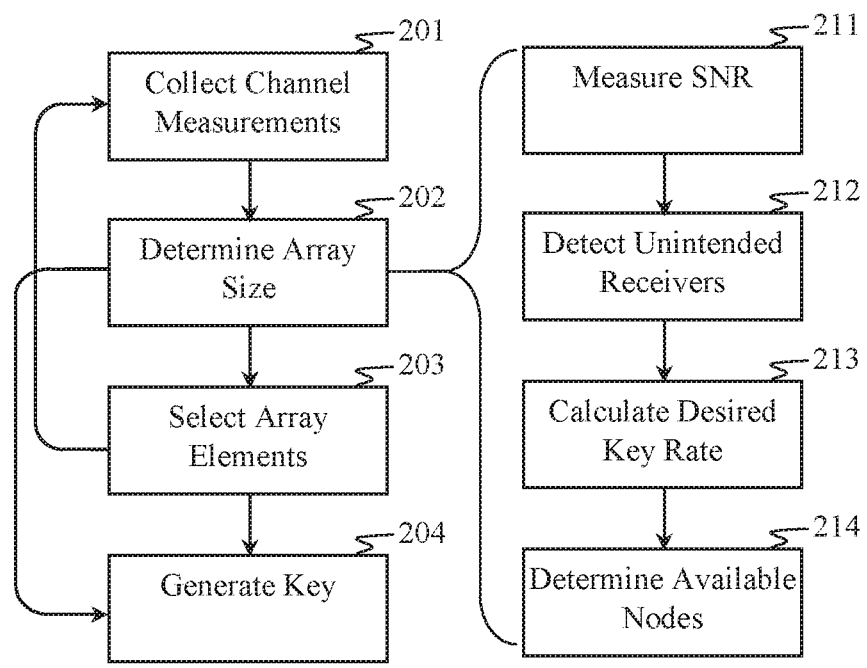
FIG. 11 is a flow diagram of a method employing adaptation of a cooperative-MIMO system according to aspects of the present invention.

FIG. 11 is a flow diagram of a method employing adaptation of a cooperative-MIMO system according to aspects of the present invention. Channel measurements are collected 201, an antenna array size (i.e., the desired number of antenna elements) is determined 202, the array elements are selected 203, and a secret key is generated 204.

Various parameters may be employed for determining the array size 202. For example, an SNR may be measured or calculated 211. Antenna array parameters (e.g., the number of antenna elements and the degree of correlation between the elements) affect the achievable key-generation rate. Selecting the number of antenna elements may be highly dependent on the SNR of the channel. At low SNR, small antenna arrays outperform larger arrays for key generation due to the lower BER. However, for higher SNR, it may become advantageous to increase the array size, since increasing the array size can improve key-generation efficiency at higher SNR. Antenna selection (i.e., selecting which antennas comprise the array) may be performed to improve the SNR of the measured signals.

Unintended receivers that are potential eavesdroppers may be detected 212 and/or tracked. The number and locations of unintended receivers may be a factor in determining the array size 202. The desired key rate may be calculated 213 based on the amount of data that needs to be transmitted securely. Since larger arrays typically enable a higher number of uncorrelated channel measurements to be collected 201, higher key rates may be achieved. The array size may depend on the availability of cooperating nodes 214 that can be employed in a cooperative-MIMO configuration.

Once the array size is determined 202, array elements may be selected (or de-selected) 203. If no changes are required for the array, then the secret key is generated 204 using the most recent set of channel measurements. When array elements are selected (or de-selected) 203, new channel measurements may be collected 201, such as to compare the SNR of the current array configuration to previous configurations. In some aspects of the invention, secret key generation 204 may be performed following array selection 203, even while the array configuration is being updated.

Step 304: Channel Measurement

In the standard multipath channel model, a received signal y(t) is expressed as a convolution of a transmitted signal x(t) with a channel impulse response h(t, τ) of the time-varying multipath channel, where τ expresses the multipath delays for a fixed value of t:

$$y(t) = x(t) \otimes h(t, \tau)$$

Since the received signal y(t) comprises a series of attenuated, time-delayed, phase-shifted replicas of the transmitted signal x(t), the baseband impulse response h(t, τ) of the multipath channel can be expressed as $$h(t, \tau) = \sum_{i=0}^{N-1} a_i(t, \tau) e^{i(2\pi f_c \tau_i(t) + \phi_i(t,\tau))} \delta(\tau - \tau_i(t))$$

where $a_i(t, \tau)$ is the real amplitude and $\tau_i(t)$ is the path delay of an $i^{th}$ multipath component. The phase term $\phi_i(t, \tau)$ represents the phase shift of the $i^{th}$ multipath component. N is the total number of multipath bins, and the delta function δ( ) is a unit impulse function that designates which bins (delays $\tau_i$) have multipath components.

Figure 12A:
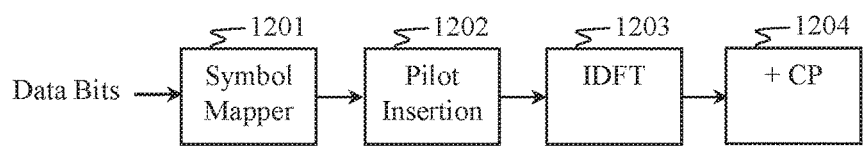
FIG. 12A is a block diagram of an OFDM transmitter configured in accordance with certain aspects of the invention.

FIG. 12A is a block diagram of an OFDM transmitter configured in accordance with certain aspects of the invention. In an OFDM transmission, some of the OFDM subcarriers may comprise pilot signals used for channel measurements (i.e., the equalizer gain and phase shift for each sub-carrier). Pilot signals and training symbols (e.g., preambles) may also be used for time synchronization to avoid inter-symbol interference and frequency synchronization to avoid inter-carrier interference caused by Doppler shift.

Data bits are grouped and mapped to symbols by a symbol mapper 1201. A pilot-insertion module 1202 periodically inserts pilots on all the OFDM subcarriers (i.e., in all the OFDM frequency bins) at predetermined time intervals, or the pilots are continuously provided to predetermined subcarriers. An IDFT 1203 transforms the data sequence X(k) of length N into a time-domain signal, x(n): x(n)=IDFT{X(k)} n=0, . . . , N−1.

A cyclic-prefix pre-pender 1204 selects a guard time that is larger than the expected delay spread, and pre-pends a cyclically extended part of the time-domain signal in order to eliminate inter-carrier interference (ICI). The resulting OFDM symbol is given as follows:

$$x_f(n) = \begin{cases} x(N+n), n = -N_L, \ldots, -1 \\ x(n), n = 0, \ldots, N-1 \end{cases}$$

where $N_L$ is the length of the guard interval.

The transmitted signal $x_f(n)$ passes through a frequency-selective time-varying fading channel with additive noise. The received signal is given by:

$$y_f(n) = x_f(n) \otimes h(n) + w(n)$$

where w(n) is AWGN and h(n) is the channel impulse response.

Figure 12B:
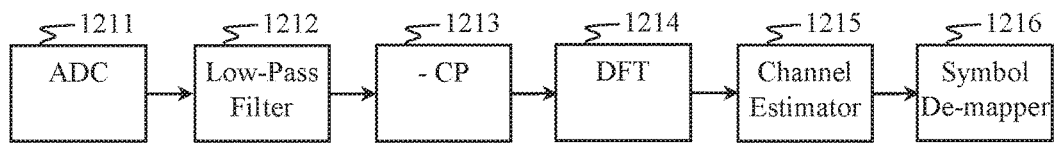
FIG. 12B is a block diagram of an OFDM receiver configured in accordance with certain aspects of the invention.

FIG. 12B is a block diagram of an OFDM receiver configured in accordance with certain aspects of the invention. The received signal is digitized in an ADC 1211, filtered by a low-pass filter 1212, and the cyclic prefix is removed in block 1213 before DFT processing in DFT block 1214. The output of the DFT 1214 is given by Y(k)=DFT{y(n)}, k=0, . . . , N−1

$$Y(k) = \frac{1}{N} \sum_{n=0}^{N-1} y(n) e^{-i(2\pi k n/N)}$$

Y(k)=X(k)H(k)+W(k), where W(k)=DFT{w(n)}.

Following the DFT 1214, a channel estimator 1215 extracts the pilot signals, and the estimated channel $H_e(k)$ for the data sub-channels is calculated. Then the transmitted symbols are estimated, such as by: $\hat{X}(k) = (H_e(k))^{-1} Y(k)$. A symbol demapper 1216 estimates the transmitted binary data from the symbol estimates.

Channel estimation at pilot frequencies may be based on LS, MMSE, or LMS methods. MMSE has been shown to perform much better than LS, and the complexity of MMSE can be reduced by deriving an optimal low-rank estimator with singular-value decomposition. In some aspects of the invention, channel estimation based on a block pilot arrangement is performed by transmitting pilots in every sub-channel and using the channel estimation for preceding and/or following symbols. For a slow fading channel, the channel estimation inside the block can be updated using decision feedback equalization at each sub-carrier.

In a fast-fading channel, a comb-type channel estimation (wherein the transmitted signal comprises dedicated pilot tones) may be employed. Channel estimation for a comb-type pilot arrangement may further comprise interpolation. Channel interpolation may include linear interpolation, second-order interpolation, low-pass interpolation, spline-cubic interpolation, or time-domain interpolation. Time-domain interpolation is typically performed using an inverse discrete Fourier transform (IDFT), zero padding, and returning to the frequency domain via a discrete Fourier transform (DFT).

In one aspect of the invention, the time intervals employed for block pilots are selected based on a function of the secret key derived from channel estimates. In another aspect of the invention, at least the pilot subcarriers for comb-type channel estimation are selected based on a function of the secret key derived from channel estimates.

Step 305: Generate Secret Key

Aspects of the invention are not limited to any particular techniques for selecting which channel measurements are used to generate a secret key. In some aspects, keys may be generated by discretizing extracted coefficients of the multipath components or quantizing the channel phases. For example, the phases of the reciprocal channel may be used to randomly rotate the phase of each transmitted data symbol, wherein encryption comprises employing one key symbol per data symbol. One aspect of the invention exploits amplitude level crossing of the measured channel coefficients to robustly generate keys with low mismatch probability. Some aspects of the invention provide for separately quantizing real and imaginary parts of the channel coefficients, since the real and imaginary parts are presumed to be independent of each other.

Figure 13:
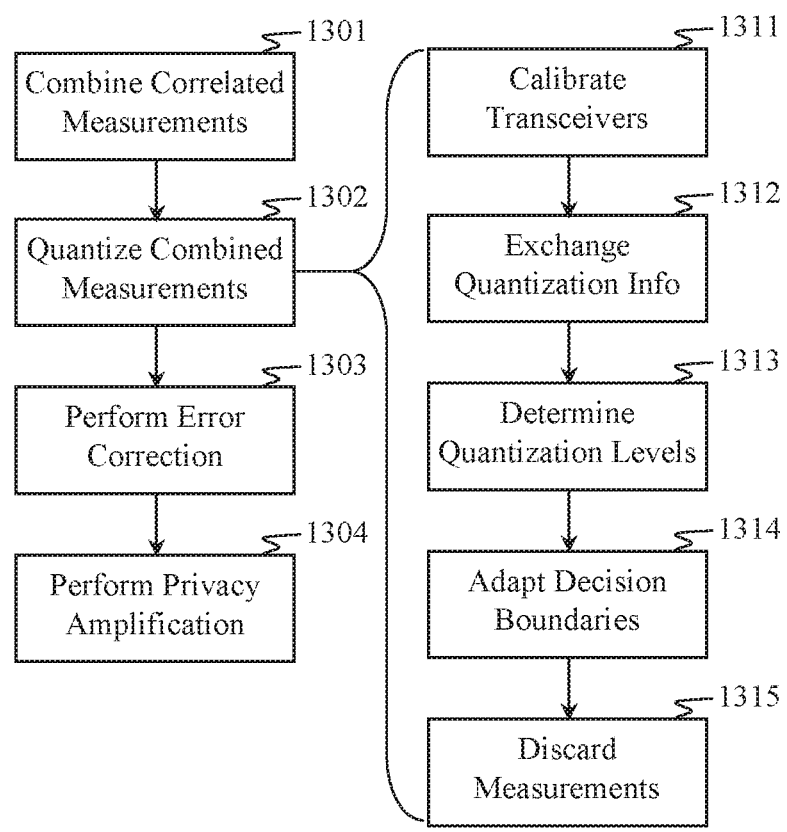
FIG. 13 is a flow diagram depicting a method for generating a secret key from channel measurements in accordance with aspects of the invention.

FIG. 13 is a flow diagram depicting a method for generating a secret key from channel measurements in accordance with aspects of the invention. Correlated measurements are combined 1301 to enhance the SNR of the values to be quantized 1302. Error correction 1303 provides for correcting key mismatches between the nodes 101 and 102. Optionally, privacy amplification 1304 may be performed.

In practice, MIMO subchannels may exhibit some degree of correlation due to a poor scattering environment or closely spaced antennas. Consequently, the achievable capacity in actual propagation environments is typically lower than the theoretical capacity. According to some aspects of the invention, samples from correlated channels are combined 1301 or averaged to provide combined measurements having a higher SNR.

Quantization 1302 of the observed channel parameters can lead to measurement disagreements between two nodes establishing a channel-based key, thus resulting in key mismatch. In practical systems, differences in the way the channel is measured can result in discrepancies between the channel estimates generated by the nodes 101 and 102. Other factors, such as noise and external interference in the radio channel can also lead to differences in channel estimates, and thus, key disagreements.

In some aspects of the invention, quantizing the channel measurements may comprise calibrating the transceivers 1311 to mitigate the effects of such discrepancies and differences, exchanging quantization and (optionally) other measurement information 1312, determining quantization levels 1313, adapting quantization decision boundaries 1314, and discarding some of the measurements 1315.

In some aspects of the invention, quantization algorithms are employed that transmit information 1312 to improve key agreement without revealing information about the key to an unintended receiver. The number of quantization levels is generally selected 1313 based on the channel SNR and the desired encryption key generation rate. In some instances, the key rate may be constrained by the available SNR. In some aspects of the invention, adaptive (i.e., dynamic) quantization may be employed. For example, each node 101 and 102 may determine the quantization levels 1313 in an iterative method that comprises exchanging quantization information 1314. Typically, quantization information, such as region boundaries and number of quantization levels is shared via a public channel between the transceivers. However, quantization parameters may be determined directly from the channel measurements as if the quantization levels are selected based on the SNR of the channel vectors.

Furthermore, each node 101 and 102 may adapt its decision boundaries 1314 during a training phase to reduce channel-estimation errors, thereby improving key agreement. Such boundary adaptations 1314 may be made in response to measurement information transmitted by the other node (101 or 102) in step 1312. In some aspects, measurements near quantization boundaries may be discarded 1315.

In one aspect of the invention, channel quantization with a guard band may be employed. To exploit both amplitude and phase, the space of observable complex channels is divided into equally probable quantization sectors, and each sector is assigned a unique bit pattern. As the nodes 101 and 102 observe the channel at predetermined sample times, the bits in the corresponding sector are added to the key.

A guard band is used to reduce the probability of key mismatch by discarding channel measurements 1315 observed in the guard-band region. In a one-way handshake, Node 1 transmits a guard band indicator bit to Node 2 over a public channel indicating an observation of the channel inside or outside the guard band. Both nodes discard channel observations inside the guard band. In a two-way handshake, both nodes exchange guard band indicator bits and discard the measurement if either node indicates that the observation is inside the guard band. Increasing the guard band reduces the key-generation rate, but also reduces the symbol-mismatch rate.

Some aspects of the invention may employ error correction strategies 1303, such as LDPC coding to correct for key mismatch. The SNR required for key generation can be reduced by using LDPC codes in conjunction with other BER reduction techniques. LDPC codes allow MIMO to be exploited with significantly reduced SNR at the expense of a reduction in the key-generation rate by a factor of approximately two (corresponding to the rate 1/2 code).

LDPC coding provides a coding gain at low SNR, thus allowing a target key-generation rate to be achieved at lower SNRs. However, at higher SNRs, higher code rates (i.e., fewer redundant or parity-check bits) may be used. At a sufficiently high SNR, the coding gain is no longer necessary, so LDPC coding 1303 can be eliminated. When the SNR is high, channel estimation errors are small, and the errors tend to be primarily in estimates near quantization boundaries. Adaptive quantization (e.g., 1313 and 1314) and discarding estimates near quantization boundaries 1315 may be the principal error-mitigation techniques employed.

A method according to one aspect of the invention comprises each node 101 and 102 calculating the degree of channel correlation (e.g., delay spread) in its MIMO-OFDM channel measurements and selecting a predetermined set of uncorrelated subcarrier frequency/sub-space pairs. The nodes 101 and 102 may employ cooperative-MIMO to increase the number of independent spatial channels, thereby increasing the key-generation rate.

The nodes 101 and 102 identify correlated measurements (e.g., correlated channels) and combine the correlated measurements 1301 to produce combined measurements with increased SNR. Channel measurements may be collected while performing full-duplex simultaneous pilot transmission and channel sounding in which the transmit signal is cancelled at the receiver.

The first node 101 estimates the full covariance from the combined estimates of its channel vector $h_a$ and decorrelates $h_a$ using the eigenvectors $U_a$. For example, in a MIMO system with $N_t$ transmit antennas and $N_r$ receive antennas, the channel from the transmitter to the receiver is an $N_r \times N_t$ channel matrix, H, and the reverse link from the receiver to the transmitter is an $N_t \times N_r$ channel matrix, $\bar{H}$, where $H = \bar{H}^T$. These matrices are represented by an $N_t N_r \times 1$ vector, $h = \text{vec}\{H\} = \text{vec}\{\bar{H}^T\}$. Node 101 computes the covariance $R = E\{hh^T\}$ and the eigen-decomposition, $R = U \Lambda U^T$, where $\Lambda$ is the diagonal matrix of non-negative real eigenvalues and U is the unitary matrix of eigenvectors. Then node 101 constructs the decorrelated channel vector $\hat{h} = U^T h$.

Node 101 generates a key using a coefficient quantization algorithm with flexible quantization levels determined by the SNR for each element of the channel vector. Node 101 also determines the quantization-map bits and forms syndromes of the key's binary sequence by multiplying the binary sequence with a parity-check matrix of the LDPC codes.

The eigenvectors, quantization levels, quantization-map bits, and syndromes of the binary bits are transmitted through the public insecure, but authenticated channel from Node 101 to Node 102. If an eavesdropper is an active attacker, a secure channel may be provided to protect data integrity of the transmissions. For example, the nodes 101 and 102 may share an initial key prior to transmission.

Node 102 performs a decorrelation of the received eigenvectors, and, based on the quantization regions determined by the quantization-map bits and quantization levels, generates a key binary sequence using the same coefficient quantization algorithm. An estimate of Node 101's binary sequence is obtained with the help of the syndromes and Node 102's binary sequence. Some aspects of the invention may employ soft decisions or mixed decision processing (i.e., a combination of soft and hard decisions) in the detection of the binary sequence using LDPC codes. If the syndromes of the bit sequences are transmitted over the public channel, privacy amplification may be performed on the binary sequences using a universal class of Hash functions for producing the final secret key.

Step 306: Coordinate Channel Updates

In one aspect of the invention, the nodes 101 and 102 estimate their peer-to-peer reciprocal channel using the same training sequences and/or pilot tones that the third-party network 103 uses for channel estimation. In another aspect of the invention, the nodes 101 and 102 may employ the data-payload portion of the third-party network's 103 frame format for transmitting known symbols, which are used for estimating the peer-to-peer channel. In either aspect, a selection of training symbols (e.g., subcarriers selected for pilot tones and/or time slots during which known symbols are transmitted) may be based on secret key. Since both nodes 101 and 102 generate the same secret key, that key may be used to select pilot tones and/or data sequences at a transmitting node, and the key may be used at a receiving node for selecting subcarrier frequency bins and/or time slots in the received signal for measuring the peer-to-peer channel.

Figure 14A:
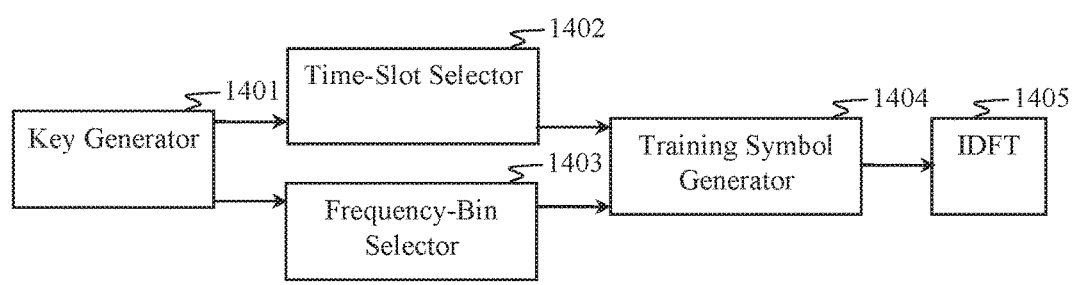
FIG. 14A is a block diagram of a transmitter configured in accordance with aspects of the invention for transmitting known symbols in time slots and/or subcarrier frequency bins determined from a function of the secret key.

FIG. 14A is a block diagram of a transmitter configured for transmitting known symbols in time slots and/or subcarrier frequency bins determined from a function of the secret key. A key generator 1401 supplies the secret key to at least one of a time-slot selector 1402 and a frequency-bin selector 1403. The time-slot selector 1402 selects a sequence of time slots based on a predetermined function of the secret key, wherein the predetermined function is employed by both nodes 101 and 102. The frequency-bin selector 1403 selects one or more frequency bins based on a predetermined function of the secret key, wherein the predetermined function is employed by both nodes 101 and 102.

In some aspects of the invention, the frequency-bin selector 1403 may generate a combination of time slots and frequency bins for transmitting pilot tones, such as in a frequency-hopped OFDM system or a block-type OFDM channel-estimation scheme. In a comb-type channel-estimation scheme, the pilot tones may be varied with respect to time. A training-symbol generator 1404 generates the known symbols and maps the symbols onto the frequency bins of an IDFT 1405 in accordance with the frequency bin selections and/or time-slot selections.

Figure 14B:
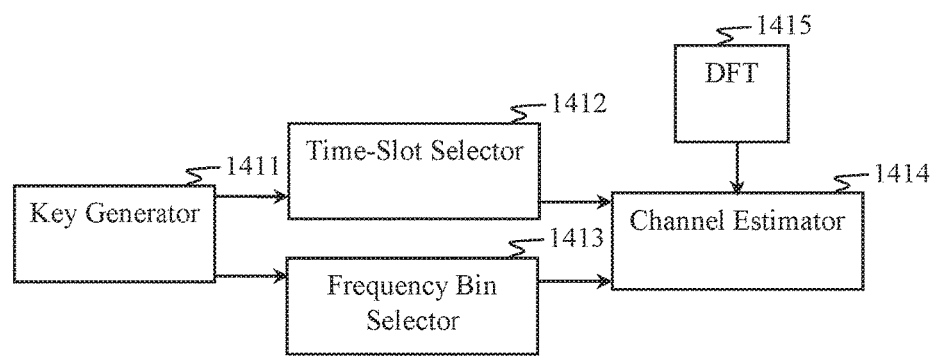
FIG. 14B is a block diagram of a receiver configured for performing channel estimation in accordance with an aspect of the invention.

FIG. 14B is a block diagram of a receiver configured for performing channel estimation in accordance with an aspect of the invention. A received baseband signal is separated into its frequency components by a DFT 1415. Frequency bins comprising known training symbols or pilot tones are selected for processing by a channel estimator 1414. The channel estimator 1414 is responsive to at least one of frequency-bin information and timing information received by at least one of a frequency bin selector 1413 and a time-slot selector 1412, respectively. A key generator 1411 supplies a secret key (which is preferably identical to the secret key generated by key generator 1401) to the frequency-bin selector 1413 and the time-slot selector 1412. The frequency-bin selector 1413 operates in a similar manner as the frequency-bin selector 1403, and the time-slot selector 1412 operates in a similar manner as the time-slot selector 1402.

Step 307: Adapt Data to Key Rate

According to one aspect of the invention, when the data to be transmitted exceeds the maximum key rate, data to be transmitted may be divided into a sensitive data portion and a non-sensitive data portion in a data-sanitization step. For example, the data may be separated such that the data rate of the sensitive portion is less than or equal to the maximum key rate. An encryption process providing a high security level is applied to the sensitive data, and a relatively less secure process may be applied to the non-sensitive data prior to transmission.

As used herein, data sanitization comprises the process of separating sensitive information from a document or other medium. When dealing with classified information, sanitization can reduce the document's classification level, possibly yielding an unclassified document. Data-sanitization may comprise redaction, which generally refers to the editing or blacking out of text in a document, such as to allow selective disclosure of information in the document while keeping other parts of the document secret. With respect to aspects of the invention, such applications of data sanitization comprise separating essential or sensitive information from data, documents, images, audio, video, and/or other media to generate a smaller data portion for encryption, such as a highly secure encryption algorithm constrained by a low key generation rate.

Step 308: Select Reference Signal

Figure 15:
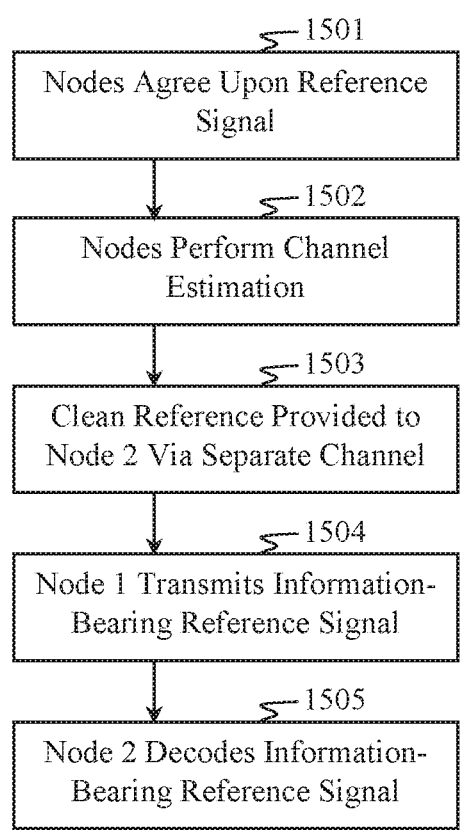
FIG. 15 is a flow diagram depicting a communication method in accordance with an aspect of the invention.

FIG. 15 is a flow diagram depicting a communication method in accordance with an aspect of the invention. The nodes 101 and 102 agree upon a common reference signal 1501. For example, a signal broadcast by a third node (such as a base station, access point, or another client in a third-party network 103) is received by the first node 101 and rebroadcast with information-bearing channel distortions to the second node 102. The selected reference signal may comprise a network control channel or portions of a broadcast signal, such as pilot sequences in the downlink transmitted by a base station.

Each node 101 and 102 performs channel estimation 1502 of its reciprocal peer-to-peer channel and its channel with the third-party network. This enables the second node 102 to employ at least a first spatial channel for receiving transmissions from the first node 101 and at least a second spatial channel for receiving transmissions from the third-party network. Thus, at least one of the first node 101 and the second node 102 may employ spatial processing for providing a clean reference signal to the second node 102 via a separate channel 1503 from the channel employed in the peer-to-peer link. The first node 101 transmits an information-bearing reference signal 1504 to the second node 102 via the peer-to-peer link. Upon separating the received clean reference from the information-bearing reference, the second node 102 decodes the information-bearing reference 1505.

Figure 16A:
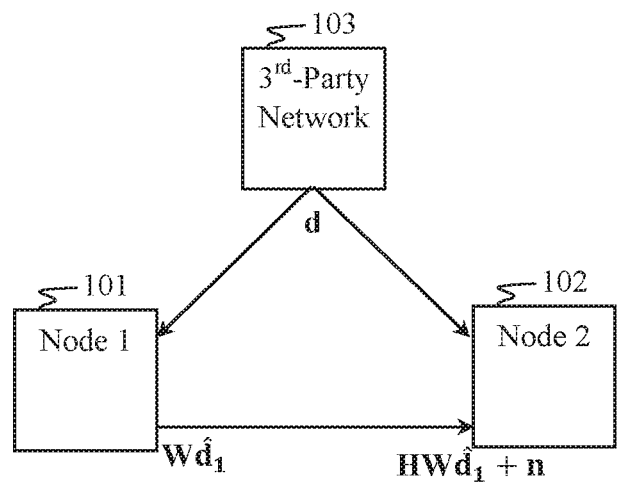
FIG. 16A depicts an aspect of the invention wherein a third-party transmission signal is employed as a reference signal.

FIG. 16A depicts an aspect of the invention wherein a third-party transmission d is employed as the selected reference signal. The first node 101 receives the transmission d and transmits an estimated version $\hat{d}_1$ imparted with synthesized channel distortions W. The information-bearing reference signal is received at the second node 102 after being distorted by the reciprocal peer-to-peer channel denoted by H. The second node 102 may employ spatial processing to separate its received third-party transmission d from the received information-bearing reference signal. The node 102 employs its channel estimate of H and its estimate of the reference d to decode the received information-bearing reference.

Figure 16B:
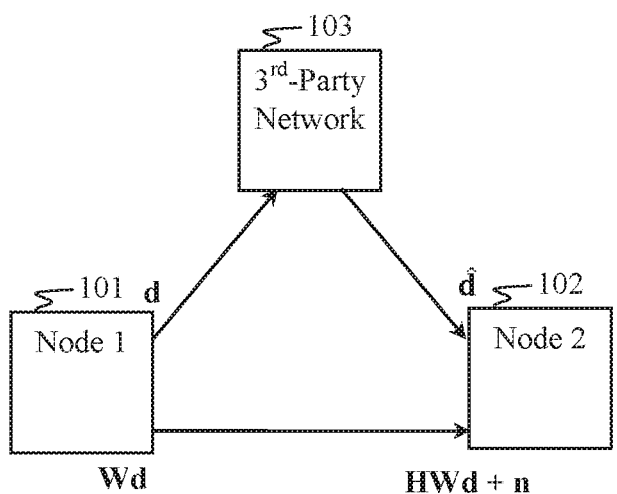
FIG. 16B depicts an aspect of the invention wherein a first node transmits a clean reference signal via a third-party network and a distorted reference signal with information-bearing synthesized channel distortions via a peer-to-peer channel to a second node.

FIG. 16B depicts an aspect of the invention wherein the first node 101 transmits a clean reference signal d via a third-party network 103 and a distorted reference signal Wd with information-bearing synthesized channel distortions W via a peer-to-peer channel to the second node 102. The second node generates an estimated reference signal $\hat{d}$ from the signal received from the third-party network 103, which, along with the channel estimate of H, is used to decode the received information-bearing reference signal.

In one aspect of the invention, node 101 employs its third-party assigned uplink channel to transmit both the clean reference d and the information-bearing reference Wd. Node 101 may employ a first spatial channel for transmitting the clean reference d and a second spatial channel for transmitting the information-bearing reference Wd, wherein the first spatial channel is nulled at the second node 102 and the second spatial channel is nulled at the third-party network's transceiver 103. The second node employs its third-party assigned downlink channel to receive the clean reference d.

In another aspect of the invention, the first node 101 employs its third-party assigned uplink channel to transmit the clean reference d and transmits the information-bearing reference Wd in an alternative channel, such as the second node's 102 third-party assigned uplink and/or downlink channel.

Figure 17A:
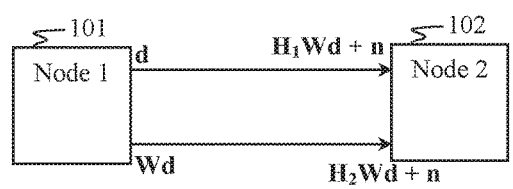
FIG. 17A depicts an aspect of the invention wherein a node employs a first peer-to-peer channel for transmitting a clean reference signal and a second peer-to-peer channel for transmitting an information-bearing reference signal.

In another aspect of the invention, as depicted in FIG. 17A, the first node 101 employs a first peer-to-peer channel for transmitting a clean reference signal d and a second peer-to-peer channel for transmitting an information-bearing reference signal Wd 1504. The second node 102 employs spatial processing for separating the received clean reference from the information-bearing reference, and employs its estimate of the clean reference d and its estimate of the reciprocal channel H to decode the received information-bearing reference.

Figure 17B:
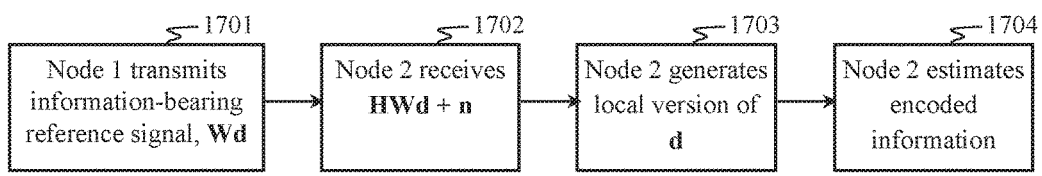
FIG. 17B depicts an aspect of the invention wherein a destination node generates its own copy of a reference signal.

In another aspect of the invention, which is depicted in FIG. 17B, the second node 102 generates a local version of the clean reference signal d. For example, the reference signal d may be predetermined and known by both nodes 101 and 102 prior to establishing the peer-to-peer link. In one aspect of the invention, the locally generated clean reference signal d may comprise a signal stored in memory in node 102.

Step 309: Synthesize Channel Distortions

Figure 18:
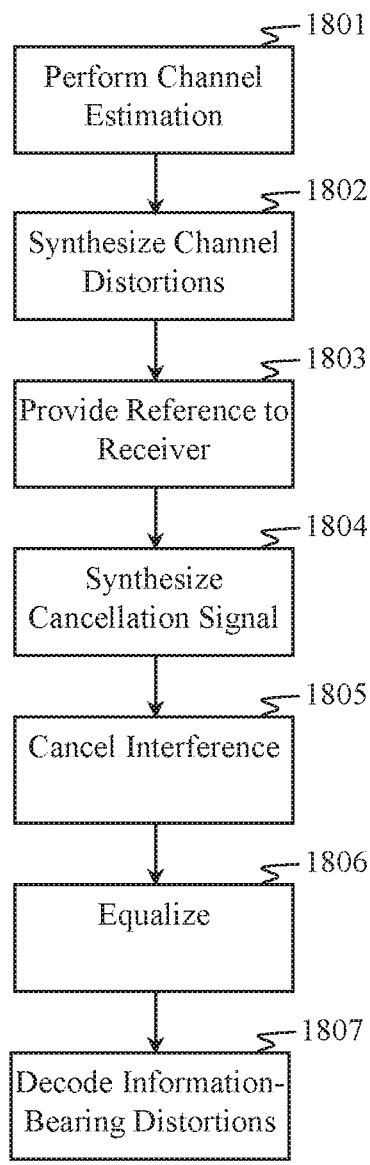
FIG. 18 depicts a method for providing a communication link with LPI/LPD properties.

In accordance with one aspect of the invention, FIG. 18 depicts a method for providing a communication link with LPI/LPD properties. Channel estimation 1801 is performed by each of at least a pair of nodes between which a covert communication link will be established. The channel estimates may comprise flat-fading channel estimates, channel impulse response estimates, subspace channel estimates, or any combination thereof.

For each subcarrier frequency of a MIMO-OFDM system, the data sequence is split into $N_T$ sub-sequences that are transmitted simultaneously using the same subcarrier frequency band. The resulting data rate increase (i.e., the spatial multiplexing gain) can be up to a factor of $N_T$ if $N_R \geq N_T$. At the receiver, the sub-sequences are separated by using an interference cancellation algorithm (e.g., linear zero-forcing (ZF), minimum-mean squared-error (MMSE), maximum-likelihood (ML), successive interference cancellation (SIC)).

Figure 19A:
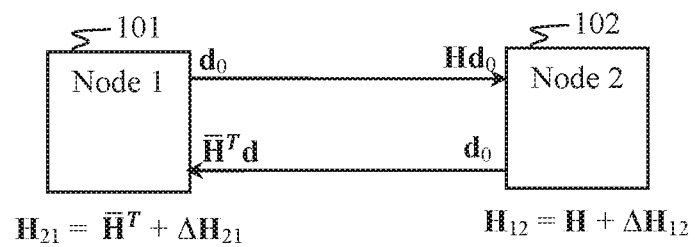
FIG. 19A illustrates a bidirectional channel estimation process in which each of a pair of nodes transmits a known training sequence or pilot signal that is used to estimate their reciprocal peer-to-peer channel.

For example, FIG. 19A illustrates a bidirectional channel estimation step in which nodes 101 and 102 each transmit a known training sequence $d_0$ or pilot signal, which is used to estimate the channel H. Node 102 generates an estimated channel matrix $H_{12}=H+\Delta H_{12}$ at a predetermined time sample wherein H is the true $N_R \times N_T$ channel matrix for the forward link from Node 101 to Node 2. Node 101 generates an estimated channel matrix $H_{21}=\overline{H}^T+\Delta H_{21}$ at a predetermined time sample wherein $\overline{H}^T$ is the true $N_T \times N_R$ channel matrix for the reverse link from Node 102 to Node 1. The matrices $\Delta H_{12}$ and $\Delta H_{21}$ represent channel estimation errors, which are typically regarded as independent random variables having zero mean with a noise variance $\sigma_n^2$.

Prior to channel estimation 1801, signaling parameters, such as the frequency band and the number of antennas employed by each node 101 and 102, are determined. For example, the nodes may employ a third-party network, such as a cellular communications network, to assign communication channels to the nodes and reserve those channels for a session interval during which the nodes 101 and 102 establish a covert communication link. The nodes may employ any combination of their assigned third-party uplink and downlink channels for the covert communication link. In one aspect of the invention, third-party channel assignments are shared between the nodes 101 and 102. In another aspect of the invention, third-party network identifiers are shared between the nodes such that each node 101 and 102 can listen for the other nodes channel assignments.

In some aspects of the invention, the nodes 101 and 102 may employ a third-party broadcast channel as the channel for the covert communication link. Thus, prior to channel estimation, at least Node 102 may perform spatial processing, such as to null (e.g., reduce its sensitivity to) a broadcast channel or downlink channel employed by the third-party network 103.

Channel estimation 1801 may be performed periodically, such as when known training sequences are transmitted, and/or concurrently with data transmissions, such as in OFDM signaling, which commonly employs pilot tones. Channel estimates are typically updated as the channel changes and when system changes occur, such as when changes to channel assignments or the number of antennas occur.

In some aspects of the invention, channel estimation 1801 may be performed in a full-duplex mode. For example, in one aspect of the invention, Nodes 101 and 102 simultaneously transmit known signals in the same frequency band while cancelling the self-interference. In another aspect of the invention, Nodes 101 and 102 employ frequency division duplexing (FDD) to transmit known signals in different frequency bands whose channels are highly correlated. In yet another aspect of the invention, Nodes 101 and 102 employ time division duplexing (TDD) for transmitting known symbols in different time intervals during which the channels are highly correlated.

Node 101 synthesizes information-bearing channel distortions 1802, which are imparted on a reference signal, which is transmitted to Node 1. Specifically, the information is disguised as channel distortions and may take the form of multipath components, variations in the complex coefficients in a flat fading channel, beam-pattern variations (such as in spatial multiplexed or MIMO signals), or any combination thereof.

In one aspect of the invention, the channel distortions are encoded using the channel estimates calculated during channel estimation 1801. Synthesizing the channel distortions 1802 may comprise establishing a predetermined set of signaling parameters 421, selecting which signaling parameters to vary based on the channel estimates 422, varying the selected signal parameters with respect to an information signal 423, and, optionally, varying the remaining signal parameters with respect to a decoy signal.

In accordance with one aspect of the invention, the predetermined set of signaling parameters may comprise a set of subcarriers in an OFDM signal, a set of subspaces in a MIMO signal, and/or a set of delays (such as determined with respect to a channel impulse response). Node 101 selects the set of signal parameters with respect to the channel estimate $H_{21}$. For example, Node 101 employs some predetermined formula to select which subcarriers of the reference signal to distort based on its channel estimate $H_{21}$. Since Node 102 generates a channel estimate $H_{12}$ that is substantially identical to $H_{21}$, using the same predetermined formula, Node 102 determines which signal parameters of the received reference signal may comprise information-bearing distortions. Node 101 may generate a data sequence comprising error-correction coding, such as parity check bits, which it then uses to distort the selected signal parameters. By using error correction coding, any detection errors or key disagreements between the Nodes 101 and 102 can be identified and possibly corrected.

If Node 101 employs beamforming weights (e.g., a beam-forming matrix W for precoding data symbols d to produce a data signal vector, x=Wd), the received signal y at Node 102 is y=HWd. The effective channel matrix at Node 102 is $H_{eff}$=HW. If Node 102 does not have an accurate estimate of the channel matrix H, the beam-forming matrix W portion of $H_{eff}$ is indistinguishable from the channel matrix H portion. Thus, aspects of the invention that corrupt an eavesdropper's channel estimates may synthesize information-bearing beamforming weights that essentially disguise information within the random communication channel.

In the case of a quadratic MIMO system wherein the number of transmit antennas and the number of receive antennas are equal ($N_T$=$N_R$), the first node 101 constructs a precoded signal vector x'=W'd, wherein the data signal vector d is multiplied by a precoding matrix W'. In one aspect of the invention, the precoded signal vector x' and the data signal vector x=Wd are transmitted concurrently. Specifically, the transmitted signal is x'+x=(W'+W)d. Thus, the precoding matrix W' may be regarded as an additional beam-pattern feature added to the first node's primary transmit beam pattern (i.e., the beam pattern corresponding to the transmission of signal x). The beam pattern of the W' component may comprise a beam pattern null in the direction of at least one unintended receiver. The coding of the information-bearing variations may be based on the estimated channel between the transmitter and the receiver. For example, a combination of how the precoding matrix W' varies and when it varies may be based on channel estimation values.

Figure 19B:
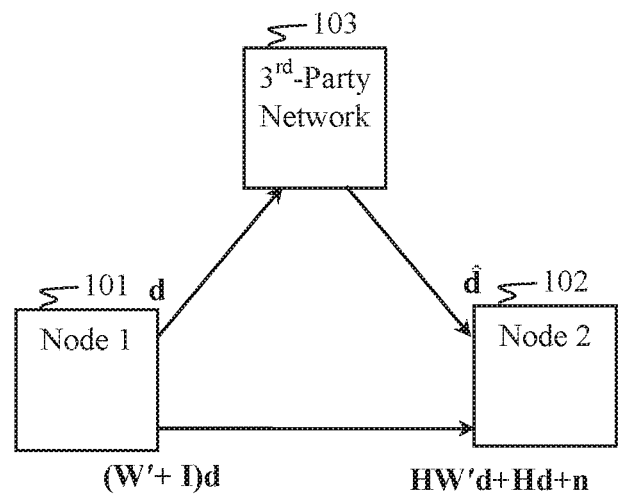
FIG. 19B illustrates an aspect of the invention wherein a first node employs an additional beam-forming matrix for transmitting an uplink signal assigned by a third-party network.

In one aspect of the invention, the first node 101 employs the additional beam-forming matrix W', such as depicted in FIG. 19B, for transmitting an uplink signal assigned by a third-party network 103. The uplink signal is also received by the second node 102. If the transmitted signal is x'+x=(W'+I)d, the uplink signal received by the second node 102 comprises y=HW'd+Hd+n. The second node 102 estimates the channel matrix H when the first node 101 transmits known data signals (and/or pilots) in the reference signal d using only its primary beam pattern.

The reference signal d is provided to the second node 1803. For example, the reference signal d may be a predetermined signal, such as a data sequence stored in memory at the second node or a locally generated data sequence that is a replica of the transmitted reference signal d. In some aspects of the invention, the reference signal d is shared between the nodes 101 and 102 prior to establishing a communication link. In one aspect of the invention, the reference signal d is a broadcast signal received from the third-party network 103 or some other network employing a different communication channel assignment than the uplink channel assigned to node 101.

In accordance with one aspect of the invention, the reference signal d is transmitted by the first node 101 to the second node 102 via the third-party network 103, such as depicted in FIG. 19B. The second node 102 receives the reference signal from the third-party network on its assigned downlink channel and processes the received signal to generate an estimated reference signal d̂.

Using estimated values of H and d̂, the second node 102 synthesizes a cancellation signal 1804 which is subtracted from the received signal 1805. Thus, the term Hd can be cancelled 1805 from y, which yields an interference-cancelled signal, y'=HW'd.

The interference-cancelled signal y' is equalized 1806. For example, in the case of a zero-forcing detector, if H is full rank, then linear zero-forcing detection yields a post-processed received signal expressed by $z'=H^{-1}y'=W'd+H^{-1}n$. Equalization 1806 may comprise alternative types of detection. For example, linear MMSE, ML, or SIC may be employed.

Decoding the information-bearing matrix W' 1807 may comprise removing the reference signal d. In one aspect of the invention, the data-bearing elements of W' are identified by some predetermined function of the estimated channel matrix H. Thus, the channel estimates $H_{12}$ may be employed for decoding W'.

Figure 20:
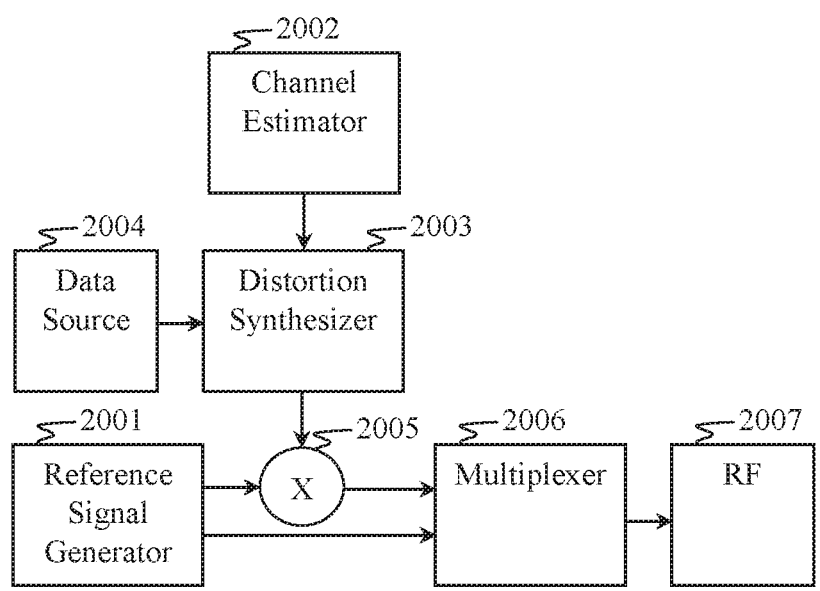
FIG. 20 is a block diagram of a transmitter configured in accordance with an aspect of the invention.

FIG. 20 is a block diagram of a transmitter configured in accordance with an aspect of the invention. A reference signal generator 2001 generates a reference signal that is employed as a carrier signal for information-bearing distortions generated to resemble channel distortions. A channel estimator 2002 provides estimates of a communication channel between the transmitter and a receiving node (such as the receiver shown in the block diagram of FIG. 21).

In some aspects of the invention, the channel estimates are used to generate a secure key. A similar (and, preferably, identical) key is generated by the receiving node and is used by the receiving node to decode its received signals. The secure key may be employed in a distortion synthesizer 2003. For example, the secure key may be input to a distortion synthesizing function that selects a set of signal parameters to be modified with respect to a data signal from a data source 2004.

In one aspect of the invention, the reference signal is an OFDM signal, and the distortion synthesizer 2003 selects which OFDM subcarriers will comprise data-bearing distortions. The distortion synthesizer 2003 may generate complex weights that resemble flat fades on the selected subcarriers. In another aspect of the invention, the reference signal is a MIMO signal, and the distortion synthesizer 2003 selects combinations of beam-forming coefficients. The beam-forming coefficients may be selected to enhance and/or suppress predetermined multipath components in accordance with a function of the channel estimates. In some aspects of the invention, the distortion synthesizer 2003 selects a set of delay intervals that can be used to convey data. Thus, the distortion synthesizer 2003 may synthesize time offsets that appear as multipath delays to unintended receivers. In another aspect of the invention, the distortion synthesizer may generate jitter and/or frequency offsets in the reference signal in accordance with a combination of the secret key and the data. In each of these cases, the information-bearing distortions imparted to the reference signal are typically removed (e.g., equalized) by the front end of an unintended receiver.

A multiplier 2005 is depicted for imparting the distortions onto the reference signal. For example, an OFDM reference signal may be multiplied by a vector of complex weights, or a MIMO reference signal may be multiplied by an antenna array weighting matrix. In another aspect of the invention, an adding function (not shown) may be employed in place of the multiplier 2005 for adding distortions to the reference signal. Additional aspects of the invention may employ alternative functions (not shown) for distorting the reference signal.

A multiplexer 2006 may be employed for multiplexing the distorted and undistorted reference signals. For example, the undistorted reference signal may be transmitted at predetermined times to enable the receiver to perform channel estimation. Similarly, the undistorted signal may be transmitted on predetermined subcarriers to enable the receiver to perform channel estimation. Since the reference signal is predetermined or otherwise known at the receiver, channel estimation does not need to be confined to just OFDM pilot tones. Rather, at least some of the data subchannels can be used for channel estimation. Similarly, at least some of the pilot subchannels may be provided with information-bearing distortions. In other multiplexing schemes, the data payload of a frame may be employed for conveying training sequences, such as sequences that may be used to estimate the channel.

Using known channel state information at the transmitter and receiver, a MIMO system can employ singular value decomposition (SVD) beamforming to effectively create parallel independent subchannels in space. These spatial subchannels typically possess different levels of SNR. Desired system performance is typically optimized by allocating power at the transmitter to each subchannel depending on its quality. For example, MIMO power loading typically focuses on optimizing data rate, total transmit power, bit error rate, or energy efficiency. However, in one aspect of the invention, a pattern of subchannel power allocations provides for conveying data. For example, a ratio of power allocations between subchannels may be selected to convey information.

Figure 21:
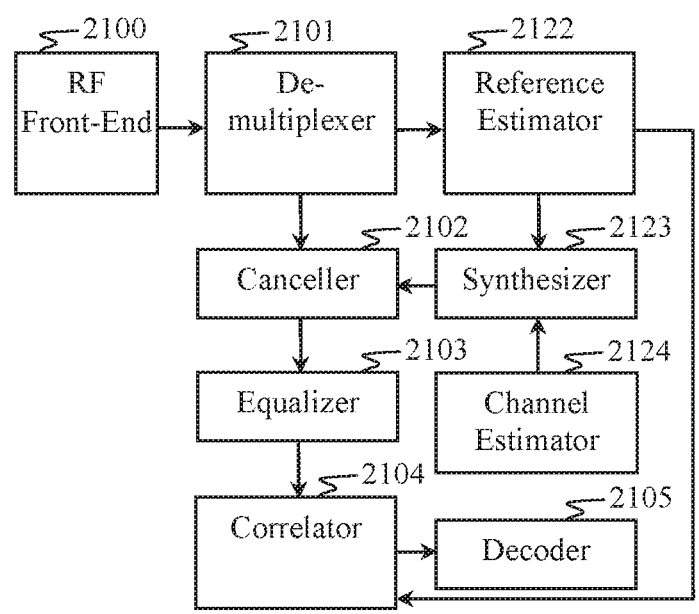
FIG. 21 is a block diagram of a receiver configured in accordance with an aspect of the invention.

FIG. 21 is a block diagram of a receiver configured in accordance with some aspects of the disclosure wherein the receiver is configured to separate a clean reference signal from an information-bearing reference signal and then decode the information-bearing reference. The receiver comprises an RF front-end 2100 coupled to a demultiplexer 2101. A first output of the demultiplexer 2101 comprises a canceller 2102 and an equalizer 2103 coupled to a correlator 2104. A second output of the demultiplexer 2102 comprises a reference estimator 2122, which is also coupled to the correlator 2104. The correlator 2104 is coupled to a decoder 2105. A channel estimator 2124 couples to a synthesizer 2123, which is coupled to the reference estimator 2122.

As described above with respect to FIG. 18, an estimate of the reference signal (produced by reference estimator 2122) and estimated channel matrix (produced by the channel estimator 2124) can be used to synthesize a cancellation signal (in the synthesizer 2123), which is then subtracted from a received signal (from the first output of the demultiplexer 2101) in the canceller 2102. The resulting interference-cancelled signal can be equalized by equalizer 2103, which can comprise any of the equalization techniques disclosed herein. Decoding the information-bearing precoding matrix may comprise removing the reference signal (such as may be performed by the correlator 2104). In one aspect of the disclosure, the data-bearing elements of the precoding matrix are identified by some predetermined function of the estimated channel matrix. Thus, the channel estimates may be employed for decoding the received signal.

Figures 22A, 22B:
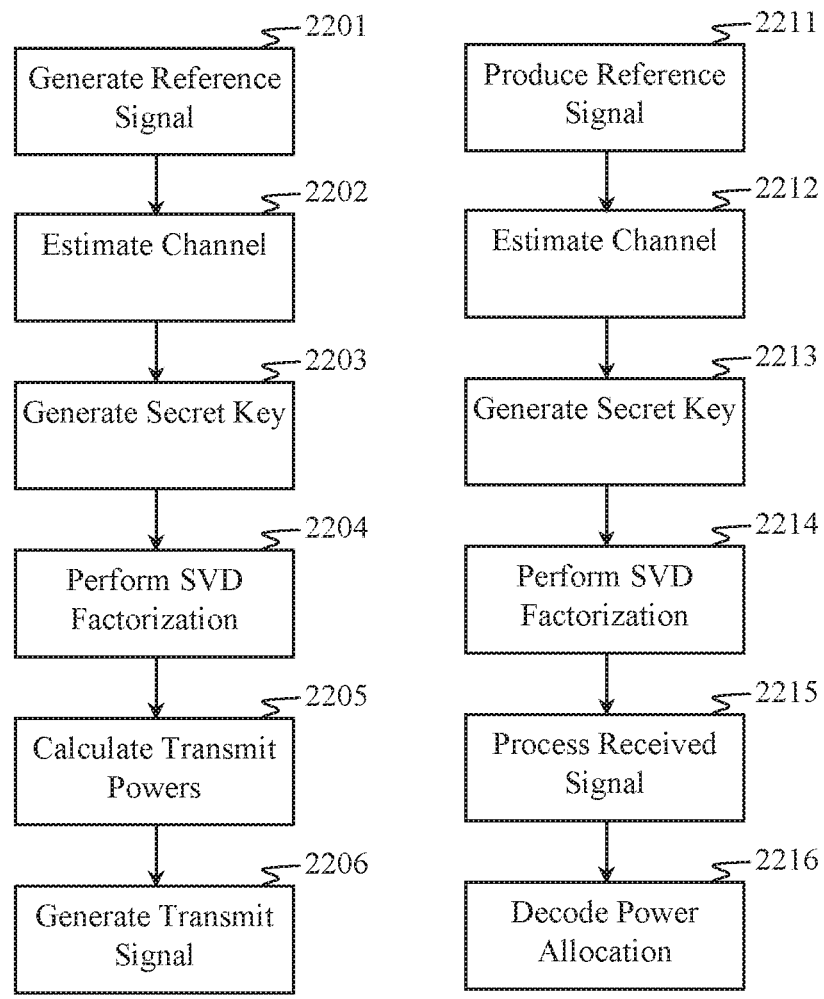
FIG. 22A is a flow diagram of a communication method according to one aspect of the invention.
FIG. 22B is a flow diagram of a communication method according to an aspect of the invention.

FIG. 22A is a flow diagram of a communication method according to one aspect of the invention wherein an $N_T \times N_R$ MIMO system with $N_{SS}$ spatial subchannels per subcarrier frequency is provided with information-bearing subchannel power allocations. The number $N_{SS}$ of spatial subchannels may be selected based on various factors, including channel estimates, SNR measurements, the number of transmit and receive antennas, and the number of undesired receivers. In a Cooperative-MIMO system, $N_{SS}$ may depend on the number of available cooperating nodes at either or both the transmit side and the receive side of the communication link.

A reference signal is generated 2201 from bits that are coded and modulated. A set of the coded bits are mapped to a constellation symbol $x_i$ for each subchannel $i \in \{1, 2, \ldots, N_{SS}\}$. The received signal $y \in \mathbb{C}^{N_R}$ is a linear transformation of the transmitted signal $s \in \mathbb{C}^{N_T}$ plus an additive noise $n \in \mathbb{C}^{N_R}$, $y = Hs + w$, where $H \in \mathbb{C}^{N_R \times N_T}$ is the MIMO channel matrix, and $w$ has i.i.d. complex Gaussian elements with zero-mean and unit variance.

Channel estimation 2202 is performed by both a transmitting node and a receiving node, and may comprise periodically updating the estimated MIMO channel matrix H. In a Cooperative-MIMO system, channel estimation may be performed by one or more of the cooperating nodes. In aspects of the invention that employ Cooperative-MIMO, it is understood that operations typically performed at each of the transmitting node and the receiving node may be performed by one or more cooperating nodes. Both the transmitting node and the receiving node may generate a secret key 2203 from their channel estimates.

Both the transmitting node and the receiving node perform SVD factorization 2204 of their estimated channel H. The SVD factorization of H is expressed by $H = U\Sigma V^\dagger$, where U is an $N_R \times N_R$ unitary matrix whose columns are the eigenvectors of the matrix $HH^\dagger$, V is a $N_T \times N_T$ unitary matrix whose columns are the eigenvectors of the matrix $H^\dagger H$, and $\Sigma$ an $N_R \times N_T$ diagonal matrix whose diagonal elements are the non-negative real singular values given by $[\Sigma]_{i,i} = \sqrt{\lambda_i(HH^\dagger)}$ for $i=1, 2, \ldots, r$, where $\lambda_i(HH^\dagger)$ is the $i^{th}$ largest eigenvalue of matrix $HH^\dagger$, and r is the rank of H.

At the transmitting node, transmit power values for each spatial subchannel are calculated 2205 based on the calculated eigenvalues $\lambda_i$, the secret key, and an information signal to be conveyed to the receiving node. The resulting coded power allocation may take the form of a power matrix, P.

The transmitted signal s is generated 2206 via a linear transformation $s = VPx$, where V is an $N_T \times N_{ss}$ transmit beamforming/precoding matrix obtained from the SVD of H 2204, P is an $N_{ss} \times N_{ss}$ diagonal matrix where $[P]_{i,i} = P_i$ for $i=1, 2, \ldots, N_{ss}$, where $P_i$ is the transmit power allocated to the $i^{th}$ spatial subchannel 2205, and $x \in A^{N_{ss}}$ is the reference symbol vector drawn from unit-energy constellation set A.

FIG. 22B is a flow diagram of a communication method according to an aspect of the invention wherein a receiver of an $N_T \times N_R$ MIMO system with $N_{SS}$ spatial subchannels per subcarrier frequency is configured for receiving and decoding information-bearing subchannel power allocations. The reference signal generated at the transmitting node is produced at the receiving node 2211. For example, the reference signal may be transmitted to the receiving node, and the receiving node may produce 2211 an estimate of the transmitted reference signal. Alternatively, the reference signal may originate from a predetermined source (e.g., a signal broadcast by an alternative communication system that is received and estimated by both the transmitting node and the receiving node). In one aspect of the invention, the reference signal may comprise a predetermined data sequence known by both the transmitting and receiving nodes prior to establishing the communication link and stored in memory at the receiving node. In another aspect of the invention, the reference signal may be generated locally by the receiving node, such as from an algorithm that is common to both the transmitting node and the receiving node.

The receiving node produces channel estimates 2212 that correspond to channel estimates produced by the transmitting node 2202. The receiving node may generate a secret key 2213 that preferably is identical to the secret key generated by the transmitting node 2203. The receiving node performs SVD factorization 2214 of its estimated channel H.

The received signal y is linearly processed 2215 with an $N_{ss} \times N_R$ matrix, $U^\dagger$, obtained from the SVD of H 2214 to yield $\tilde{y} = U^\dagger y = \Sigma Px + \tilde{w}$, where $\Sigma = \text{diag}(\sqrt{\lambda_1}, \sqrt{\lambda_2}, \ldots, \sqrt{\lambda_{N_{ss}}})$, and $\tilde{w} = U^\dagger w$ is an equivalent noise vector with i.i.d. complex Gaussian elements with zero-mean and unit variance. Since the reference signal x is known or estimated, it may be removed from the received signal.

The effective receiver SNR for subchannel i is $\gamma_i P_i$, where $\gamma_i$ is the receiver subchannel-to-noise ratio of subchannel i and is defined as $\gamma_i = \gamma_i = \lambda_i / \sigma_i^2$, where $\sigma_i^2$ is the variance of the noise and interference experienced by subchannel i. The subchannel powers $P_i$ are decoded 2216 using a predetermined algorithm, which is based on the calculated eigenvalues $\lambda_i$ and the secret key, to produce an estimate of the transmitted information.

It should be understood that various aspects of the invention may be implemented in hardware, firmware, software, or combinations thereof. In such aspects, any of the steps 301-311 can be implemented in hardware, firmware, and/or software to perform the functions of the present invention. For example, the same piece of hardware, firmware, or module of software may perform one or more of the steps 301-311. Alternatively, one or more of the steps 301-311 may be performed across multiple platforms, such as in a distributed computing environment.

When implemented in software, firmware, middleware or microcode, the program code or code segments to perform the necessary tasks may be stored in a machine-readable medium such as a storage medium, or memory. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As disclosed herein, the term "computer-readable media" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant arts.

The invention claimed is:

1. A communication method, comprising:
    receiving from a wireless network a data signal to be retransmitted in the wireless network; generating a power matrix from a message to be sent; and
    precoding the power matrix to the data signal before retransmitting the data signal;
    retransmitting the data signal precoded with the power matrix.

2. The method of claim 1, wherein the data signal is employed as a carrier signal for information conveyed in the power matrix.

3. The method of claim 1, wherein precoding is performed at baseband.

4. The method of claim 1, further comprising precoding the data signal with a precoding matrix calculated from channel measurements.

5. The method of claim 1, wherein signal features precoded to a retransmitted data signal based on the message are configured to be equalized by at least one node in the wireless network.

6. The method of claim 1, wherein signal features precoded to a retransmitted data signal based on the message are configured to appear as variations in complex coefficients of a flat fading channel in the wireless network.

7. The method of claim 1, wherein at least one of the power matrix and the message are encoded with a secret key calculated from channel measurements.

8. A node in a wireless network, comprising
    a radio transceiver configured to receive and retransmit a data signal in the wireless network; and
    a precoder configured to generate transmit power values from a message to be transmitted, and precode the data signal with the transmit power values before the data signal is retransmitted in the wireless network;

the radio transceiver is further configured to retransmit the data signal precoded with the power matrix.

9. The node of claim 8, wherein the precoder is configured to precode the data signal with a precoding matrix calculated from channel measurements.

10. The node of claim 9, wherein the precoder comprises a Multiple Input, Multiple Output (MIMO) precoder.

11. The node of claim 9, wherein the precoder is configured to determine an encryption key from channel measurements.

12. The node of claim 9, wherein the precoder is configured to communicate first information residing in bits of the data signal with a first network node while simultaneously communicating second information residing in the transmit power values to a second network node.

13. The node of claim 9, wherein at least one of the radio transceiver and the precoder is configured to transmit a clean version of the data signal.

14. A method performed by a receiver in a wireless network, comprising: receiving a retransmitted radio signal to produce a received signal, the retransmitted radio signal comprising a data signal precoded with power values configured to convey information; determining the data signal; and removing the data signal from the received signal to decode the information.

15. The method of claim 14, wherein determining the data signal comprises at least one of receiving a clean version of the data signal from a communication channel that is different from a communication channel in which the retransmitted radio signal is received, receiving a clean version of the data signal from a communication subchannel that is different from a communication subchannel in which the retransmitted radio signal is received, retrieving a clean version of the data signal stored in memory at the receiver, and locally generating the data signal at the receiver.

16. The method of claim 14, further comprising removing channel distortions from the received signal prior to decoding the information.

17. The method of claim 16, wherein removing the channel distortions comprises equalizing the received signal.

18. The method of claim 16, wherein at least one of the receiving and the removing comprises Multiple Input, Multiple Output (MIMO) processing.

19. The method of claim 14, wherein the retransmitted radio signal comprises an Orthogonal Frequency Division Multiplexing signal, and the receiving is configured to perform a Discrete Fourier Transform.

20. A radio transceiver in a wireless network, comprising: a radio receiver configured to receive a retransmitted radio signal to produce a received signal, the retransmitted radio signal comprising a data signal precoded with power values that convey information; a reference signal processor configured to determine the data signal; and a decoder configured to remove the data signal from the received signal to estimate the power values and decode the information therefrom.

21. The radio transceiver of claim 20, wherein the decoder comprises an equalizer configured to remove channel distortions in the received signal.

22. The radio transceiver of claim 20, wherein the decoder comprises a Multiple Input, Multiple Output (MIMO) processor.

23. The radio transceiver of claim 20, wherein the retransmitted radio signal comprises an Orthogonal Frequency Division Multiplexing signal, and the receiver is configured to perform a Discrete Fourier Transform thereon.

24. The radio transceiver of claim 20, wherein the reference signal processor is configured to determine the data signal by at least one of deriving a clean version of the data signal from a communication channel that is different from a communication channel in which the retransmitted radio signal is received, deriving a clean version of the data signal from a communication subchannel that is different from a communication subchannel in which the retransmitted radio signal is received, retrieving a clean version of the data signal stored in a memory, and locally generating the data signal.

* * * * *